(12) United States Patent
Park et al.

(10) Patent No.: US 10,633,778 B2
(45) Date of Patent: *Apr. 28, 2020

(54) HOME APPLIANCE AND ONLINE SYSTEM INCLUDING THE SAME

(71) Applicant: LG ELECTRONICS INC., Seoul (KR)

(72) Inventors: Junpil Park, Changwon-si (KR); Mikyung Ha, Changwon-si (KR); Byunggee Sung, Changwon-si (KR)

(73) Assignee: LG Electronics Inc., Seoul (KR)

( * ) Notice: Subject to any disclaimer, the term of this patent is extended or adjusted under 35 U.S.C. 154(b) by 199 days.

This patent is subject to a terminal disclaimer.

(21) Appl. No.: 15/918,294

(22) Filed: Mar. 12, 2018

(65) Prior Publication Data
US 2018/0202093 A1 Jul. 19, 2018

Related U.S. Application Data

(63) Continuation of application No. 14/018,090, filed on Sep. 4, 2013, now Pat. No. 9,951,451.

(30) Foreign Application Priority Data

Sep. 6, 2012 (KR) .......................... 10-2012-0098945

(51) Int. Cl.
G05B 15/02 (2006.01)
D06F 33/02 (2006.01)
(Continued)

(52) U.S. Cl.
CPC .......... D06F 33/02 (2013.01); A47L 15/0063 (2013.01); A47L 15/4293 (2013.01);
(Continued)

(58) Field of Classification Search
CPC ............. A47L 15/0063; A47L 15/4293; A47L 2301/04; A47L 2301/08; A47L 2501/22;
(Continued)

(56) References Cited

U.S. PATENT DOCUMENTS 3,398,460 A 8/1968 Elders
6,121,593 A * 9/2000 Mansbery ................ F24C 7/08
219/679

(Continued)

FOREIGN PATENT DOCUMENTS

CN 1343806 4/2002
CN 1359214 7/2002
(Continued)

OTHER PUBLICATIONS

Samsung, "WF457ARG Washing Machine User Manual", Mar. 9, 2012 (accessed from <<http://www.homedepot.com/catalog/pdfImages/8d/8de09998-0044-4bb2-b56b-80dae1a939f5.pdf>> on Jan. 11, 2016) (Year: 2012).*

(Continued)

Primary Examiner — Michael J Huntley
(74) Attorney, Agent, or Firm — KED & Associates, LLP

(57) ABSTRACT

An online system, including a smart laundry machine, which is capable of easily and inexpensively using the smart laundry machine is disclosed. A further extended type of a smart home appliance, an online system including the same, and a method of using the online system are also disclosed. A laundry machine communicates with a server, is remotely controlled by an external terminal through the server, and has a control panel for a user interface. The control panel includes a course selection unit, an option selection unit, a start button, a display unit to display state information of the laundry machine, and a remote service activation input unit to set or cancel remote service activation according to user (Continued)

selection. The remote control is performed only in a case in which the remote service activation is set.

20 Claims, 30 Drawing Sheets

(51) Int. Cl.
| | |
|---|---|
| *D06F 39/00* | (2020.01) |
| *H04L 12/28* | (2006.01) |
| *A47L 15/42* | (2006.01) |
| *A47L 15/00* | (2006.01) |

(52) U.S. Cl.
CPC ........ *D06F 39/005* (2013.01); *H04L 12/2818* (2013.01); *A47L 2301/04* (2013.01); *A47L 2301/08* (2013.01); *A47L 2501/22* (2013.01); *A47L 2501/26* (2013.01); *A47L 2501/32* (2013.01); *D06F 2210/00* (2013.01); *G05B 15/02* (2013.01)

(58) Field of Classification Search
CPC ............. A47L 2501/26; A47L 2501/32; D06F 2210/00; D06F 33/02; D06F 39/005; G05B 15/02; H04L 12/2818
See application file for complete search history.

(56) References Cited

U.S. PATENT DOCUMENTS

| | | | |
|---|---|---|---|
| 7,196,623 B1 | 3/2007 | Wang | |
| 7,363,031 B1* | 4/2008 | Aisa | .................... H02J 13/0079 455/419 |
| 7,464,426 B2 | 12/2008 | Lee et al. | |
| 7,526,539 B1 | 4/2009 | Hsu | |
| 7,603,119 B1 | 10/2009 | Durig | |
| 7,693,546 B1* | 4/2010 | Gioscia | ................. G06F 1/1626 455/41.2 |
| 7,742,951 B2 | 6/2010 | Ebrom et al. | |
| 8,866,634 B2 | 10/2014 | Williamson | |
| 9,948,478 B2 | 4/2018 | Ha | |
| 2002/0032491 A1 | 3/2002 | Imamura | |
| 2002/0065770 A1* | 5/2002 | Ebata | ...................... G06Q 20/10 705/39 |
| 2002/0075160 A1* | 6/2002 | Racz | ...................... G08C 17/00 340/12.22 |
| 2002/0095483 A1* | 7/2002 | Lee | ......................... D06F 33/02 709/219 |
| 2002/0180579 A1 | 12/2002 | Nsgaoka | |
| 2002/0184361 A1* | 12/2002 | Eden | ....................... H04L 41/12 709/224 |
| 2003/0051040 A1 | 3/2003 | Tanikawa et al. | |
| 2003/0100962 A1 | 5/2003 | Sumita et al. | |
| 2003/0171113 A1 | 9/2003 | Choi | |
| 2003/0178894 A1 | 9/2003 | Ghent | |
| 2004/0002779 A1 | 1/2004 | Shimba et al. | |
| 2004/0158620 A1 | 8/2004 | Ha et al. | |
| 2004/0249961 A1 | 12/2004 | Katsube | |
| 2005/0033647 A1 | 2/2005 | Crisp, III | |
| 2005/0050647 A1 | 3/2005 | Tanaka | |
| 2005/0054329 A1 | 3/2005 | Kokudo | |
| 2005/0088276 A1 | 4/2005 | Lee et al. | |
| 2005/0096788 A1* | 5/2005 | Peterson | ............. A47L 15/0021 700/244 |
| 2005/0108326 A1 | 5/2005 | Tuttle | |
| 2005/0131991 A1 | 6/2005 | Ogawa et al. | |
| 2005/0162273 A1 | 7/2005 | Yoon | |
| 2005/0201393 A1 | 9/2005 | Hatayama | |
| 2006/0208066 A1 | 9/2006 | Finn | |
| 2006/0220834 A1 | 10/2006 | Maeng | |
| 2006/0239208 A1 | 10/2006 | Roberts | |
| 2007/0005955 A1 | 1/2007 | Pyle et al. | |
| 2007/0046493 A1 | 3/2007 | Park et al. | |
| 2007/0053513 A1 | 3/2007 | Hoffberg | |
| 2007/0118638 A1 | 5/2007 | Ban et al. | |
| 2007/0118862 A1 | 5/2007 | Jeong | |
| 2007/0279248 A1 | 12/2007 | Matsumoto | |
| 2008/0042868 A1 | 2/2008 | Lee et al. | |
| 2008/0113683 A1 | 5/2008 | Paas | |
| 2008/0132179 A1 | 6/2008 | Takeshita | |
| 2008/0136581 A1 | 6/2008 | Heilman | |
| 2008/0224834 A1 | 9/2008 | Oosaka et al. | |
| 2009/0006970 A1 | 1/2009 | Jeffery et al. | |
| 2009/0007346 A1 | 1/2009 | Ha | |
| 2009/0090137 A1* | 4/2009 | Jeong | ...................... D06F 33/02 68/12.02 |
| 2009/0138107 A1 | 5/2009 | Ha | |
| 2009/0170532 A1 | 7/2009 | Lee | |
| 2009/0195349 A1 | 8/2009 | Frader-Thompson | |
| 2009/0195404 A1 | 8/2009 | Combs, Jr. | |
| 2009/0217335 A1 | 8/2009 | Wong | |
| 2009/0322550 A1 | 12/2009 | Yu | |
| 2010/0095716 A1 | 4/2010 | Bae | |
| 2010/0115788 A1 | 5/2010 | Kim | |
| 2010/0165879 A1 | 7/2010 | Gupta et al. | |
| 2010/0185537 A1 | 7/2010 | Bari | |
| 2010/0217837 A1 | 8/2010 | Ansari | |
| 2010/0286801 A1 | 11/2010 | Yum et al. | |
| 2010/0296441 A1 | 11/2010 | Barkan | |
| 2011/0007901 A1 | 1/2011 | Ikeda | |
| 2011/0012738 A1 | 1/2011 | Nakamura | |
| 2011/0054967 A1 | 3/2011 | Han et al. | |
| 2011/0082933 A1 | 4/2011 | Zhou | |
| 2011/0103264 A1 | 5/2011 | Wentink | |
| 2011/0137430 A1 | 6/2011 | Kohanek | |
| 2011/0153110 A1* | 6/2011 | Drake | ................. A47L 15/0047 700/296 |
| 2011/0215919 A1 | 9/2011 | Hernandez | |
| 2011/0230236 A1 | 9/2011 | Tsai et al. | |
| 2011/0238865 A1 | 9/2011 | Terashima et al. | |
| 2011/0256850 A1 | 10/2011 | Selander | |
| 2011/0260903 A1* | 10/2011 | Wong | ...................... G08C 23/04 341/176 |
| 2011/0312278 A1 | 12/2011 | Matsushita | |
| 2012/0019674 A1 | 1/2012 | Ohnishi | |
| 2012/0056827 A1* | 3/2012 | Kim | ......................... D06F 33/02 345/173 |
| 2012/0110747 A1* | 5/2012 | Yum | ................... A47L 15/0063 8/137 |
| 2012/0147802 A1 | 6/2012 | Ukita et al. | |
| 2012/0154108 A1 | 6/2012 | Sugaya | |
| 2012/0296489 A1 | 11/2012 | Lee | |
| 2012/0316984 A1 | 12/2012 | Glassman | |
| 2013/0006400 A1 | 1/2013 | Caceres | |
| 2013/0042416 A1* | 2/2013 | Balinski | ................ D06F 39/002 8/137 |
| 2013/0049607 A1 | 2/2013 | Urata | |
| 2013/0106613 A1* | 5/2013 | Lee | ....................... H04W 4/021 340/691.3 |
| 2013/0135116 A1* | 5/2013 | Garbe | ...................... G06Q 30/02 340/870.02 |
| 2013/0185079 A1* | 7/2013 | Park | ........................ D06F 33/02 704/275 |
| 2013/0254310 A1 | 9/2013 | Krywaniuk | |
| 2013/0268134 A1* | 10/2013 | Tuller | ................. A47L 15/0047 700/291 |
| 2013/0321136 A1* | 12/2013 | Park | ....................... G08C 17/02 340/12.54 |
| 2013/0346300 A1* | 12/2013 | Kang | ...................... G05B 15/02 705/39 |
| 2015/0323915 A1* | 11/2015 | Warren | ................... G05B 15/02 700/275 |

FOREIGN PATENT DOCUMENTS

| | | |
|---|---|---|
| CN | 1452352 | 10/2003 |
| CN | 1499162 | 5/2004 |
| CN | 1598770 | 3/2005 |
| CN | 1606282 | 4/2005 |
| CN | 1625134 | 6/2005 |
| CN | 1714191 | 12/2005 |
| CN | 1770714 | 5/2006 |

(56) References Cited

FOREIGN PATENT DOCUMENTS

| | | |
|---|---|---|
| CN | 1893529 | 1/2007 |
| CN | 1921528 A | 2/2007 |
| CN | 101022341 | 8/2007 |
| CN | 101167305 A | 4/2008 |
| CN | 201588102 | 9/2010 |
| CN | 101873343 | 10/2010 |
| CN | 201770893 | 3/2011 |
| CN | 102043404 | 5/2011 |
| CN | 102409508 | 4/2012 |
| CN | 103718505 | 4/2014 |
| DE | 10 2010 063 083 A1 | 6/2012 |
| EP | 1 217 475 | 6/2002 |
| EP | 1 233 602 A1 | 8/2002 |
| EP | 1 402 101 A1 | 3/2004 |
| EP | 1 779 762 A1 | 5/2007 |
| EP | 1 852 543 A1 | 11/2007 |
| EP | 2 611 079 A1 | 7/2013 |
| EP | 2 662 482 A2 | 11/2013 |
| EP | 2 662 485 A2 | 11/2013 |
| EP | 2 737 660 | 6/2014 |
| EP | 2737659 | 6/2014 |
| JP | 2003-071178 | 3/2003 |
| JP | 2003-209892 A | 7/2003 |
| JP | 2003-225491 A | 8/2003 |
| JP | 2004-096591 | 3/2004 |
| JP | 2004-350930 A | 12/2004 |
| JP | 2005-034186 | 2/2005 |
| JP | 2005-102060 | 4/2005 |
| JP | 2005-110967 | 4/2005 |
| JP | 2005-185460 A | 7/2005 |
| JP | 2006-314806 A | 11/2006 |
| JP | 2009-135783 | 6/2009 |
| KR | 10-2003-0045238 | 6/2003 |
| KR | 10-2003-0054234 A | 7/2003 |
| KR | 10-2003-0064722 A | 8/2003 |
| KR | 10-2004-0045657 A | 6/2004 |
| KR | 10-2004-0069530 A | 8/2004 |
| KR | 10-2005-0078542 | 8/2005 |
| KR | 10-0634798 | 10/2006 |
| KR | 10-2008-0024307 A | 3/2008 |
| KR | 10-2009-0041687 | 4/2009 |
| KR | 10-2009-0095351 | 9/2009 |
| KR | 10-2011-0131655 | 12/2011 |
| KR | 10-2012-0023497 A | 3/2012 |
| TW | M391242 | 10/2010 |
| WO | WO 03/004753 A1 | 1/2003 |
| WO | WO 2006/106393 A2 | 10/2006 |
| WO | WO 2010/131817 | 11/2010 |
| WO | WO 2012/093897 A2 | 7/2012 |
| WO | WO 2013/015655 | 1/2013 |

OTHER PUBLICATIONS

United States Office Action dated Dec. 14, 2018 issued in co-pending related U.S. Appl. No. 15/695,660.
United States Office Action dated Aug. 23, 2017 issued in co-pending related U.S. Appl. No. 14/018,090 (now U.S. Pat. No. 9,951,451).
Notice of Allowance dated Dec. 5, 2017 issued in co-pending U.S. Appl. No. 14/238,694(now U.S. Pat. No. 9,948,478).
United States Office Action dated May 15, 2018 issued in co-pending related U.S. Appl. No. 15/612,528.
United States Office Action dated Feb. 4, 2019 issued in co-pending related U.S. Appl. No. 15/697,987.
United States Office Action dated Aug. 7, 2019 issued in co-pending related U.S. Appl. No. 15/915,762.
Japanese Notice of Allowance dated Jan. 29, 2019 issued in Application No. 2013-184329.
European Office Action dated Feb. 13, 2019 issued in Application No. 12825863.9.
Thomas Ricker, "LG Thinq linqs your smart appliances with WiFi and smart apps", Jan. 4, 2011, pp. 1-9 ,LG_thinQ.pdf>.
Sorcinelli, Don, "Rethinking Device Convergence-The Video Experience," Dec. 6, 2011 (accessed from https://web.archive.org/web/20111206143144lhttp://www.bostonpocketpc.com/CategoryView,category,Editorial.aspx on Aug. 31, 2015.
Steele, Billy, "Samsung WiFi Washer and Dryer hands-on (video)," Jan. 10, 2012 (accessed from http://www.engadget.com/2012/01/10/samsung-smarthome-wifi-washer-and-dryer-hands-on-video/ on Jan. 14, 2014.
International Search Report issued in Application No. PCT/KR2012/006034 dated Jan. 24, 2013.
International Search Report issued in Application No. PCT/KR2012/006032 dated Jan. 25, 2013.
Korean Notice of Allowance dated May 16, 2013 issued in Application No. 10-2011-0074770 (with English translation).
European Search Report dated Nov. 21, 2013 issued in Application No. 13 18 3129.
European Search Report dated Jan. 28, 2014 issued in Application No. 13 183 127.3.
Philips: "Philips DS8800W/37 User Manual" Jan. 1, 2011; pp. 1-26; Retrieved from the Internet on Feb. 12, 2015: URL.:http://download.p4c.philips.com/files/d/ds8800w 37/ds8800w37 dfu aen.pdf.
European Search Report dated Dec. 12, 2014 issued in Application No. 12 817 390.3.
Philips: "Philips DS9800W Registreerige oma toode 1-10 ja saage abi veebilehelt"; Jul. 8, 2011; pp. 1-16; Retrieved from the Internet on Feb. 13, 2015: URL:http://download.p4c.philips.com/files/d/ds9800w 10 /ds9800w 10 dfu est.pdf.
European Search Report dated Mar. 4, 2015 issued in Application No. 12817976.9.
U.S. Office Action dated Feb. 2, 2016 issued in U.S. Appl. No. 14/017,517.
Chinese Office Action dated Feb. 22, 2016 issued in Application No. 200680014710.3 (with English translation).
Chinese Office Action dated Apr. 1, 2016 issued in Application No. 201310403718.0 (with English translation).
U.S. Office Action dated Jun. 9, 2016 issued in U.S. Appl. No. 14/017,517.
"Samsung rolls out smart appliances at CES 2012 (smart fridge, Android powered washer and dryer)", YouTube video, uploaded Jan. 14, 2012, https://www.youtube.com/watch?v=ZAhiHY5Ktxk.
"Smart Appliances Steal the Show at CES 2012", Jan. 21, 2012, https://plassappliance.worldpress.com/2012/01/21 smart-appliances-steal-the-show-at-ces-2012/.
Samsung, "WF457ARG Washing Machine User Manual," Mar. 9, 2012 (accessed from http://www.homedepot.com/catalog/pdfimages/8d/8de09998-0044-4gbb2-b56b-80daela939f5,pdf, on Jan. 11, 2016.
HowardForums.com: Samsung Washer/Dryer that can be controlled with phone, howardchui, YouTube, Feb. 24, 2012 (accessed from https://www.youtube.com/watch?v=NTGnbYuXtzs on Jan. 15, 2016.
European Notice of Opposition dated Jan. 15, 2016 issued in Application No. 13183129.9 (with English translation).
European Notice of Opposition dated Jan. 18, 2016 issued in Application No. 13183129.9 (with English translation).
Chinese Office Action dated Jan. 27, 2016 issued in Application No. 201280037644.7 (English Translation Attached).
U.S. Office Action dated Jan. 29, 2016 issued in U.S. Appl. No. 14/018,090.
Australian Notice of Acceptance for Application 2013224716 dated Mar. 23, 2016 (Advertised Apr. 21, 2016).
Chinese Office Action for Application 201310403925.6 dated May 5, 2016 (full Chinese text and full English-language translation).
Chinese Office Action for Application 2012-80037644 dated Sep. 12, 2016 (full Chinese text and English language translation).
U.S. Office Action dated Oct. 27, 2016 issued in U.S. Appl. No. 14/018,090.
U.S. Office Action dated Nov. 4, 2016 issued in U.S. Appl. No. 14/017,517.
Chinese Office Action issued in Application 201280037644.7 dated Dec. 21, 2016 (full Chinese Text and full English translation).
Chinese Patent Certificate dated Apr. 12, 2017 issued in Application No. 201310403718.0.

(56) References Cited

OTHER PUBLICATIONS

Korean Notice of Allowance issued in Application 10-2012-0098946 dated Aug. 13, 2017 (English translation only).

* cited by examiner

HOME APPLIANCE AND ONLINE SYSTEM INCLUDING THE SAME

CROSS-REFERENCE TO RELATED APPLICATIONS

This application is a Continuation Application of prior U.S. patent application Ser. No. 14/018,090 filed Sep. 4, 2013, which claims priority under 35 U.S.C. § 119 to Korean Patent Application No. 10-2012-0098945, filed on Sep. 6, 2012, whose entire disclosures are hereby incorporated by reference.

BACKGROUND

1. Field

The present invention relates to a laundry machine and, more particularly, to a laundry machine which communicates with external devices to perform not only original functions of the laundry machine but also additional functions of the laundry machine. The additional functions include functions extended from the original functions of the laundry machine and new functions having no relation to the original functions of the laundry machine. In addition, the laundry machine includes functions to operate the laundry machine without directly approaching the laundry machine from outside. Such a laundry machine may be referred to as a smart laundry machine.

The present invention also relates to an online system including the smart laundry machine and, more particularly, to an online system that is capable of easily and inexpensively using the smart laundry machine.

The present invention also relates to a further extended type of a smart home appliance, an online system including the same, and a method of using the online system.

2. Background

A washing machine that washes clothes is a typical laundry machine. A drying machine that dries clothes may also be referred to as a laundry machine. Of course, a combo washer dryer that washes and dries clothes may also be referred to as a laundry machine.

In recent years, a refresher that refreshes clothes using hot air or steam instead of washing using water has entered the market. The refresher may also be referred to as a laundry machine.

In addition, a dishwasher that washes dishes may also be referred to as a laundry machine in a broad sense although the dishwasher does not wash clothes. In this specification, therefore, the laundry machine includes all kinds of equipment as described above.

In this specification, a washing machine as a typical example of a laundry machine will hereinafter be described. The present invention is applicable to other kinds of laundry machines as long as the laundry machines are neither exclusive nor incompatible.

FIG. 1 shows a control panel applicable to a conventional washing machine or a washing machine according to an embodiment of the present invention.

The control panel is provided to interface with a user. Therefore, the control panel is generally provided at the front of the washing machine for easy access and operation. The control panel may have various buttons for user manipulation and various display units to provide information to the user.

A main function of the washing machine is washing. Accordingly, the washing machine is provided with a course selection unit 110 or a main function selection unit to select various washing courses. The user may select a course using the course selection unit 110 or the main function selection unit. For example, the course selection unit 110 may be formed in the shape of a rotary knob. A course indication unit 111 may be provided at the control panel 100 in order for user to easily select a course. The user may manipulate the course selection unit 110 based on the course indication unit 111 to select a desired washing course.

As shown in FIG. 1, the course indication unit 111 has various washing courses, which are arranged around the rotary knob 110. The user may turn the rotary knob 110 to select a corresponding washing course. A display unit 121 may be provided to indicate the selected washing course. Consequently, the user may easily confirm the selected washing course through the display unit 121. The display unit 121 may be implemented as a blinking light emitting diode (LED) or the like.

An option selection unit 120 may be provided to select optional functions added to or modified from the main functions. The option selection unit 120 may be provided in a variety of forms. For example, FIG. 1 shows an option selection unit 120 which enables selection of options related to washing 120a, rinsing 120b, spin-drying 120c, water temperature 120d, drying 120e, steam 120f, and a scheduled operation 120g. An option display unit 122 to display the selected option may also be provided. The option display unit 122 may also be implemented as an LED or the like.

In addition, the control panel 100 may be provided with an auxiliary selection unit 123 to select an auxiliary function. The auxiliary selection unit 123 may be provided to dry (122) and refresh (121) shoes in a space, such as a pedestal, separated from the washing machine. The auxiliary selection unit 123 may be configured to have the same form as the option selection unit 120. In addition, the auxiliary selection unit 123 may be provided to select items different from the abovementioned washing courses and options.

The control panel 100 may be provided with a state display unit 130 to display a state of the washing machine. The state display unit 130 may display the current operation state of the washing machine or information regarding a course, an option, and time selected by the user.

For example, in a case in which the washing machine is performing a rinsing step, the state display unit 130 may display "rinsing in progress." In a case in which the washing machine is waiting for course input, the state display unit 130 may display "please input a washing course." In addition, the state display unit 130 may indicate a current time or a time (remaining time) remaining until the washing machine carries out an entire washing course to complete operation.

Meanwhile, the control panel 100 may be provided with a power selection unit 140 to power the washing machine on and off and a run/pause selection unit 150 to put the washing machine into operation or pause.

The control panel 100 as described above and the washing machine including the same have the following problems.

It is difficult to implement an additional user interface at the control panel 100 in addition to a basic user interface of the control panel 100 due to spatial limitations of the control panel 100. Of course, a user interface may be implemented at the control panel 100 in complex and various fashions, which however requires excessive concentration and prior knowledge on the part of the user. Furthermore, it is difficult to manufacture the control panel 100 and a high capacity memory is needed with the result that cost of the washing machine is excessively increased.

In addition, the selection units 110 and 120 and the indication and display units 111, 121, and 122 have preset functions with the result that it is not easy to extend the functions of the respective units.

Meanwhile, the washing machine is generally installed in a laundry room, which the user does not frequently access. For this reason, the user may have much trouble in entering the laundry room and directly accessing the washing machine only for using the washing machine.

In addition, even though various kinds of information are indicated and displayed through the indication and display units 111, 121, 122, and 130, such indication or display of information may be meaningless if the user does not directly access the washing machine.

Consequently, it is necessary to provide a laundry machine that is capable of carrying out not only original functions of the laundry machine but also functions extended from the original functions of the laundry machine or new functions having no relation to the original functions of the laundry machine.

In addition, it is necessary to provide a laundry machine that is capable of implementing extended functions or new functions without replacement or modification of an existing control panel, i.e. without change in hardware of the laundry machine.

In particular, an operation time of the laundry machine from start to end of the operation procedure may be one hour or more. In addition, it is not desirable to leave laundry in the laundry machine after washing is completed. Consequently, it is necessary to remotely control the laundry machine when away from home. This is because, when the user remotely controls the laundry machine, it is possible to preset an operation completion time of the laundry machine and to remove washed laundry from the laundry machine at a set time.

Of course, a conventional laundry machine has a scheduled operation option. In this case, however, it is not possible to remotely control the laundry machine outdoors. For this reason, even when a scheduled operation condition cannot be satisfied (for example, a user returns home later than expected), it is not possible to change a scheduled operation time.

Meanwhile, it may be necessary to remotely control many home appliances, such as an oven, a cleaner, a refrigerator, a water purifier, and an air conditioner, in addition to a laundry machine, such as a drying machine, a washing machine, a refresher, and a dishwasher.

The above problems are not merely limited to the laundry machine. The problems may be equally caused even in home appliances, such as a refrigerator, an oven, an air conditioner, and a robot cleaner. This is because each of the home appliances has a configuration corresponding to the control panel of the laundry machine, i.e. a configuration for a user interface. In addition, this is because each of the home appliances has selection units to carry out original functions of each home appliance and indication and display units corresponding to the selection units and the need to extend the functions to implement new functions are the same as in the laundry machine. That is, extension of the user interface is difficult for many home appliances due to spatial or cost limitations thereof.

Several persons commonly use home appliances in a house due to characteristics of the home appliances. As a result, confusion between one user who directly manipulates the laundry machine and another user who remotely controls the laundry machine may occur. For this reason, it is necessary to provide a home appliance that can be remotely controlled in a state in which such confusion is prevented.

In this specification, a washing machine as a typical example of the laundry machine will hereinafter be described. The present invention is applicable to other kinds of laundry machines as long as the laundry machines are neither exclusive nor incompatible.

BRIEF DESCRIPTION OF THE DRAWINGS

The embodiments will be described in detail with reference to the following drawings in which like reference numerals refer to like elements wherein.

DETAILED DESCRIPTION

Reference will now be made in detail to the preferred embodiments of the present invention, examples of which are illustrated in the accompanying drawings. Wherever possible, the same reference numbers will be used throughout the drawings to refer to the same or like parts.

Figure 2:
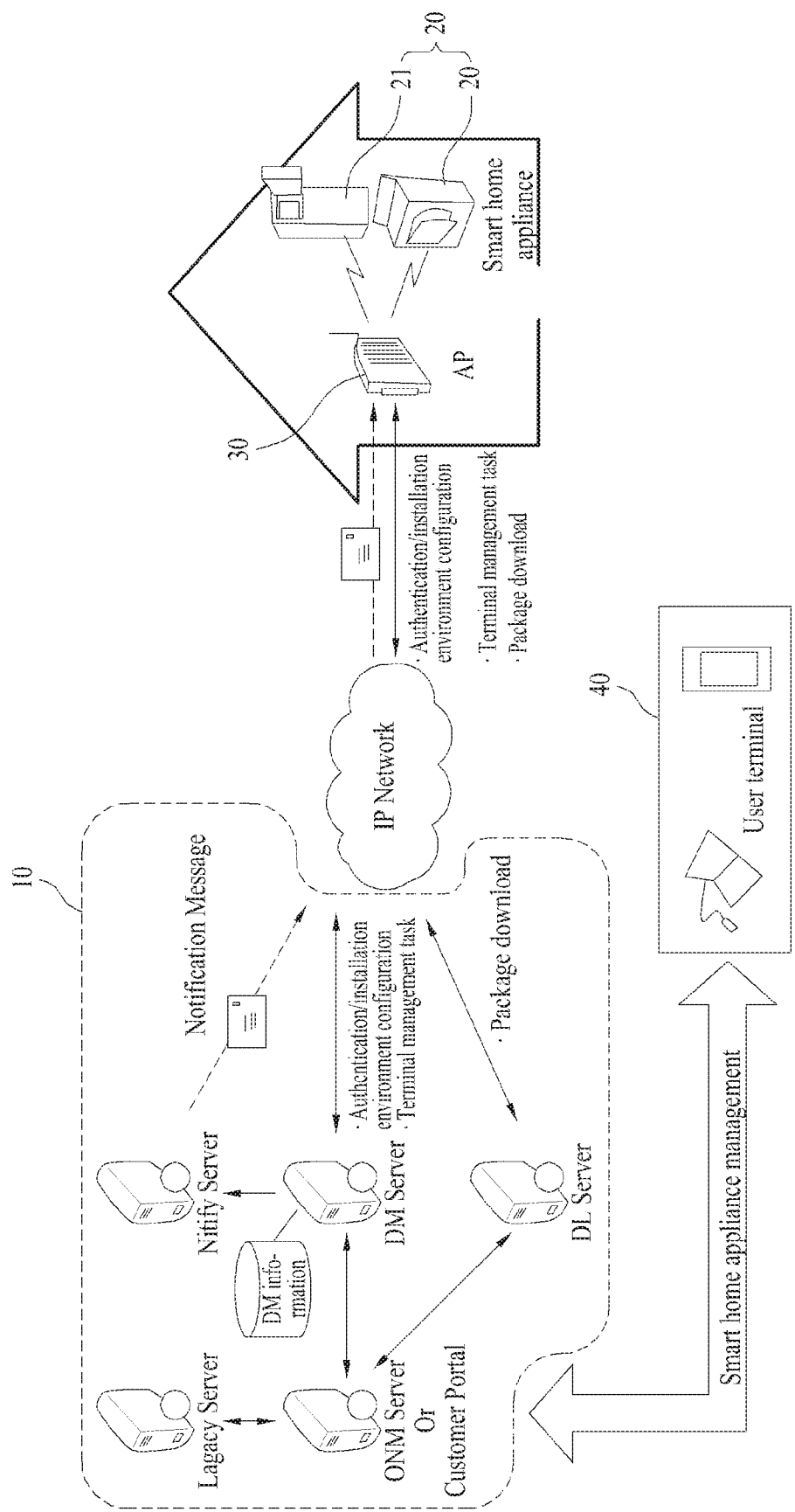
FIG. 2 is a view showing linkage among a server, a home appliance, and an external terminal, which may implement an embodiment of the present invention.

FIG. 2 is a view showing an embodiment of an online system, which may implement the present invention. Specifically, FIG. 2 schematically shows an overall configuration in which home appliances located in each house are communication connected to a server such that the home appliances are managed by the server.

In order to perform a remote service, a server 10 to manage all home appliances to be served is needed. Home appliances 20 and 21 to be served are communication connected to the server 10 to perform a command received from the server 10. Service request may be received by the server 10 through the home appliance 20. In addition, in order to receive service request from a user through a means other than the home appliance, an additional means, such as an Internet site (hereinafter, referred to as a "user site") 60 (see FIG. 4), an external terminal, or a user terminal 40, may be provided. Concrete examples of a remote service will hereinafter be described.

The external terminal or the user terminal 40 means a device, such as a mobile phone, a smartphone, a laptop computer, or a personal computer, which is provided separately from the home appliance or the server. In addition, the external terminal or the user terminal 40 means a device having a communication module to communicate with external devices.

A business owner who performs management of a home appliance or provides a service through the home appliance may provide a remote service through establishment of the server. As needed, the business owner may establish the user site.

A user may purchase a home appliance 20, with respect to which the user can receive a remote service from the server 10, and may receive such a remote service. This home appliance may be a product having a communication module to communicate with the server 10 and a client side protocol to execute a command received from the server 10. For an existing appliance, with respect to which the user cannot receive a service from the server, on the other hand, an additional device including the communication module and the client side protocol may be used. The user may purchase such an additional device and connect the additional device to the existing appliance such that the user may receive a service with respect to the existing appliance.

In a case in which the home appliance 20 needs a remote service from the server 10, a unique device identification (ID) of the home appliance 20 may be registered with the server 10 such that the home appliance 20 can be managed by the server 10.

When the home appliance 20 accesses the server 10, the server 10 may specify the home appliance 20 based on a device ID. In addition to the device ID, property information (for example, appliance type, model information, etc.) of the corresponding home appliance may be registered with the server 10. The device ID may be configured irrespective of the property information, such as appliance type or model information, of the product. Alternatively, the device ID may be coded together with the property information of the product. Consequently, the server 10 may recognize appliance type or model information using the device ID alone.

The user may request a service through the home appliance 20 registered with the server 10 to receive the service with respect to the home appliance 20. For example, when the user selects and inputs a desired service through a display window (display unit) of a refrigerator 21, the refrigerator 21 may request the corresponding service from the server 10.

Meanwhile, in many cases, home appliances, such as a washing machine, a cleaner, an oven, an air conditioner, and a water purifier, are not always located in the vicinity of the user. For example, the home appliances may be located in the house and the user may be in the office. In this case, it may not be easy for the user to request the corresponding service from the server 10 through the home appliance 20. In addition, in many cases, the home appliances may not be provided with devices to allow input of a variety of information or to display a variety of information. For this reason, the user may request the service from the server through the external terminal 40, such as a smartphone, which the user always carries. To this end, an application for requesting such a service may be installed in the external terminal 40. The external terminal 40, such as the smartphone, may be provided with devices to allow input of a variety of information or display a variety of information such that the user may very conveniently request such a service.

In addition, as will hereinafter be described, it is possible to perform remote management, remote control, remote monitoring, and remote diagnosis of the home appliances through such applications. These functions may be examples of the remote service.

In this case, the external terminal 40 directly communicates with the server 10 and the server 10 communicates with the home appliances 21 and 22. Consequently, the user may request a remote service through the external terminal 40 and easily confirm execution and completion of the service through the external terminal 40.

It is necessary for the external terminal 40 not to directly communicate with the home appliance. This is because, to this end, the home appliance requires additional hardware or software for communication with the external terminal 40. In addition, a communication environment of the external terminal 40 may be less stable than that of the home appliance. This is because the external terminal 40 is easily movable.

On the other hand, the home appliance is generally used in a state in which the home appliance is fixed in a building. For this reason, the home appliance may stably communicate with the server through an access point (AP) in the building. Consequently, the external terminal may indirectly communicate with the home appliance via the server. As a result, it is possible to restrain the increase in cost of the home appliance and to stably and continuously provide a remote control service.

In order to request and perform such a service, however, it is necessary to specify a relationship among the external terminal 40 of the user, the home appliance 20 which needs a service, and the server 10. That is, in a case in which accessing the server 10 is performed through the home appliance 20, assessing the server 10 is performed through the ID of the home appliance and thus it is possible for the server to easily specify an object for a service. In a case in which accessing the server 10 is not performed through the home appliance 20, however, it is necessary to decide how the server specifies an object for a service.

This is because the server 10 does not provide a remote service only to a specific user and a home appliance of the specific user but may theoretically provide such a remote service to all home appliances that can receive the remote service.

For example, the user may access a user site 60 (see FIG. 4) and input a unique device ID of a home appliance for a service to request the service. The user may join the user site as a member to receive a user ID and a password. The user may log in the user site to register all home appliances owned by the user. The home appliances registered with the user site may be registered with the server together with the corresponding user ID. This may be achieved by automatically transmitting the user ID and the device IDs of all of the home appliances matched with the user ID from the user site to the server. Through these procedures, the server stores user information related to the user and home appliance information related to the home appliances. Of course, the user information and the home appliance information are stored in the server in a state in which the user information and the home appliance information are matched with each other.

On the other hand, the user may join the user site through the application installed in the external terminal 40 to receive a user ID and a password. Even in this case, the user may log in the user site to register all home appliances owned by the user. The application may be provided for a remote service of a specific home appliance or for a remote service of a plurality of home appliances, which will hereinafter be described in detail.

In addition, as previously described, the user may log in the user site to register user information including the user ID and password with the server. The user may directly register the home appliance with the server from the home appliance through such user information. That is, the home appliance may be registered with the server through the home appliance. The home appliance may have an address of the server and an address of the user site. The home appliance transmits the user information and the home appliance information to the server such that communication between the home appliance and the server is initiated. At this time, the server matches the home appliance with the user.

As a result, the server may confirm that a specific user has a specific home appliance and where the specific home appliance is installed.

Registration with the server 10 through the home appliance 20 will be described in more detail through an activation procedure, which will hereinafter be described.

In any cases, in a case in which a user receives a user ID, the user ID may be registered with the server 10 together with home appliance information of the user, i.e. unique device information, such as a device ID, such that the user information and the home appliance information are managed. The user information and the home appliance information are matched with each other. Consequently, one may be specified through the other.

The service received from the user through the user site, the external terminal 40, or the home appliance 20 may be performed by an administrator transmitting a command for a corresponding management service to the server 10. Alternatively, the user site, the external terminal, or the home appliance may directly communicate with the server through an open API of the server to directly request a management service from the server.

The server 10 has a server side protocol for a management service. The server side protocol is linked with a client side management protocol of a home appliance to perform a requested remote service.

An open mobile alliance device management (OMA DM) protocol may be used as a protocol to perform such a management service between the server 10 and the home appliance 20. In a case in which the OMA DM protocol is used, therefore, the server side may be a DM server and the home appliance side may be a DM client. Of course, another protocol may be used in addition to the OMA DM protocol. In this embodiment, the OMA DM protocol is used; however, the present invention is not limited thereto.

The server may be divided into a plurality of servers according to duties thereof. FIG. 2 exemplarily shows that the server 10 is divided into a DM server, a notification server, a DL server, an ONM server, and a legacy server. In a case in which the server is divided into a plurality of servers according to duties thereof, therefore, when a specific service is performed, the DM server may prepare for or perform another service. Consequently, it is possible to simultaneously process a plurality of services.

The servers may directly access objects in performing their duties.

Some of the servers may be configured to directly access home appliances for a service. For example, the notification server may directly transmit notification to a home appliance for a service and the DL server may directly transmit ungraded firmware to a home appliance for a service.

The server 10 may be configured differently according to the details of a management service. For example, in a case in which only firmware update will be provided as a service, the service may be performed by the DM server, the notification server, and the DL server. Consequently, the other server may not be needed. On the other hand, in a case in which a service is performed without a notification procedure of notifying a user of firmware update, even the notification server may not be needed.

In this embodiment, firmware update, software (including various kinds of content) management, home appliance diagnosis, home appliance monitoring, refrigerator expiry date notification, refrigerator food list provision, washing course upgrade, etc. are considered. Consequently, configuration of the server as shown in FIG. 2 is only illustrative and, therefore, the present invention is not limited to the configuration of the server as shown in FIG. 2.

Hereinafter, configuration and a communication environment of an online system will be described in more detail. All of the following details may not be essential to the present invention. In addition, the online system may further have configuration added through description in other parts of the specification.

(1) The server may have the following configuration.

1) DM Server

The DM server serves to issue a management command to the DM client. That is, the DM server provides a management function of remotely processing a firmware update (modem firmware/OS) management task, a software management task, a diagnostic management task, etc. through the management command. The DM server may include a session management region, a security management region, a DM protocol process region, and a SyncML protocol engine region.

2) DL Server

The DL server transmits a file to a DL client. That is, the DL server transmits information regarding a file for transmission through a download descriptor (DD) such that the DL client correctly downloads the file. The DL client is a home appliance which downloads the file. Among files downloaded in this manner, there are a firmware update package and a software management package. The DL server may include a session management region, a package management region, and a download region.

3) ONM Server or User Portal

The ONM server serves to interface with the DM or DL server and the legacy server and implements a business logic. The administrator may issue a management command or refer to management information through a management web page of the ONM server.

The user portal provides some of the functions of the ONM server to a general user, which is implemented through the open API of the DM Server. The user may request a management service from the DM server through the user portal.

4) Legacy Server

Representative legacy servers, with which the ONM server is linked, include a server to receive terminal information and a server to receive user information. That is, the legacy server transmits the user information or the home appliance information to the ONM server to provide information necessary to implement the business logic.

5) Notification Server

The notification server transmits a notification message from the DM server to the home appliance. The notification server may include a session generation region and a schedule management region.

If the home appliance is located on a private network, a connection manager specially provided to a server side may be required in order to maintain connection to the home appliance. After the home appliance is booted, the home appliance may request a TCP connection and the connection manager maintains the requested TCP connection. The DM server transmits the notification message therethrough.

6) Open API

An application in a mobile communication terminal, such as a smartphone, may remotely manage the home appliances through an open API provided by the DM Server. The Open API will hereinafter be described in detail.

(2) The home appliance may include the following configuration.

1) Communication Module

The communication module is installed in the home appliance. Type of the communication module is not particularly restricted. The communication module may be a wired communication module or a wireless communication module.

For example, the communication module may be a communication module in which Wi-Fi™ is available or a communication module in which PLC communication or ZigBee communication is available.

2) DM Client

The DM client serves to execute a management command from the DM Server. That is, the DM client provides management functions of remotely processing the firmware update management task, the software management task, the diagnosis management task, and the control management task according to the management command from the DM server.

Figure 3:
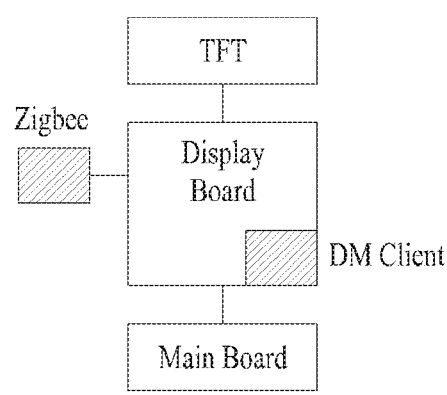
FIG. 3 is a view showing an embodiment in which a device management (DM) client is mounted in a display board of a home appliance.

FIG. 3 is a view showing an example in which the DM client is provided in a home appliance. In a case of a home appliance having a thin film transistor (TFT) display provided therein, the DM client may be mounted in a circuit board (display board) of the TFT display. In FIG. 3, a main board is a circuit board to carry out original functions of the home appliance. For example, a washing machine may generally have a main controller provided in a main board to control a water supply valve and a motor connected to a drum in order to carry out washing.

Although the DM client may be mounted in the main board of the home appliance, the DM client may be mounted in a display board because a display window may be used frequently to request the management service.

3) DL Client

The DL client mainly serves to download a package file (firmware update package, software management package, etc.) from the DL server. The DL client receives a download server URL from the DM client, accesses a download server to acquire a download descriptor (DD), and carries out a download task.

4) Agent

The agent serves to carry out a management service command requested by the home appliance according to the details of the management service. For example, an update agent serves to produce new firmware using an update package downloaded for firmware update. The update agent may be implemented in a variety of forms by manufacturers.

5) Daemon

The daemon may serve to process periodic access of the home appliance to the server. The daemon may be continuously running as long as the home appliance is plugged. For example, even if power of the washing machine is in an off state, the daemon may be maintained in an on state as long as the washing machine is plugged. If it is necessary to power the washing machine on according to request of the server, the daemon may transmit a power on command to the main board.

6) User Interface (UI)

User permission may be required to carry out the management service. In addition, the user may request the management service through the home appliance. A TFT liquid crystal display (LCD) window of the home appliance may be used as the user interface. In particular, the user interface may be provided through a touch LCD or a light emitting diode (LED) display. A display screen may be provided such that a screen for the management service is displayed on the display screen in a pop up fashion. Such a management service screen may be provided to allow of input of a user ID and a password. The user ID and password may be the user ID and password given at the time of joining the user site as a member. A server system may identify the user using the user ID and password. When a service is requested through a terminal, the terminal may transmit the user ID and password, the device ID, and service request information to the server system.

However, the user interface is not provided in all home appliances. This is because implementing interfaces for additional management services in addition to the user interface required to carry out original functions of each home appliance may require a great deal of expense and space.

For example, implementing a means to input text or the like or a display unit to display a large amount of information may not be easy for home appliances, such as a laundry machine, an air conditioner, a cleaner, and an oven.

In order to carry out the management service of the home appliance, therefore, an external terminal, such as a smartphone, may be needed. This is because the external terminal, such as the smartphone, has a communication module, a memory, OS, an input means, and a display unit. In recent years, external terminals equipped with the touch LCD or LED have come into widespread use. Therefore, limitations on the user interface of the home appliance may be supplemented or extended by the external terminal. Detailed examples will hereinafter be described.

(3) Hereinafter, a communication environment between the home appliance and the server will be described.

Basically, type of the communication environment is not particularly restricted as long as the communication environment is suitable for carrying out the management service.

FIG. 2 is a view showing an example in which the home appliance 20, having a wireless Internet communication module applied thereto, communicates with the server 10 via the Internet through an access point (AP) 30.

Upon reviewing a communication path starting from the home appliance 20 to the server 10, the communication path after the AP is a public Internet network and the communication path before the AP is a private Internet network. The home appliances 21 and 22 receive private IPs from the AP 30 and the AP 30 has a unique IP.

The server 10 also has an IP, which may be a unique IP. Therefore, a communication module, such as a Wi-Fi™ module, of the home appliance may have the unique IP of the server. Through an activation procedure, the home appliance may access the server using the IP of the server such that communication between the home appliance and the server is performed.

Subsequently, in order for the server 10 to recognize the location of the home appliance 20 and to track the location of the home appliance 20, the DM client may continuously transmit signals to the DM Server. The AP 30 transmits information of a port to which the home appliance is connected and the unique IP information of the AP 30 to the DM Server. As a result, the DM Server can recognize the location of the DM client. Of course, the home appliance may also transmit information of the AP 30, and information of the port connected to the AP 30 to the server 10 through the AP. When the home appliance 20 transmits the device ID information together with above information to the server, therefore, the server system can recognize which home appliance is at which location and may access the home appliance using the information. At this time, the user ID and password may also be transmitted together with above information.

As a result, the server 10 can recognize the location of a specific home appliance 20 of a specific user. When a specific service is requested from the server through the home appliance or the external terminal of the user, therefore, the server may easily determine a specific home appliance and carry out the specific service with respect to the specific home appliance.

(4) Administrator Portal

Although the administrator portal is not an essential element, the administrator portal may enable the administrator to effectively carry out the management task. For example, in a case of the firmware update, an administrator who updates and registers the firmware and an administrator who verifies the registered firmware update file may cooperate with each other through the administrator portal. The administrator portal may include a firmware upgrade process region, a software upgrade process region, a device management region, a system administration region, and a statistics region.

Hereinafter, details and procedures of the management service will be described.

(1) Member Joining and Activation of Home Appliance

Figure 4:
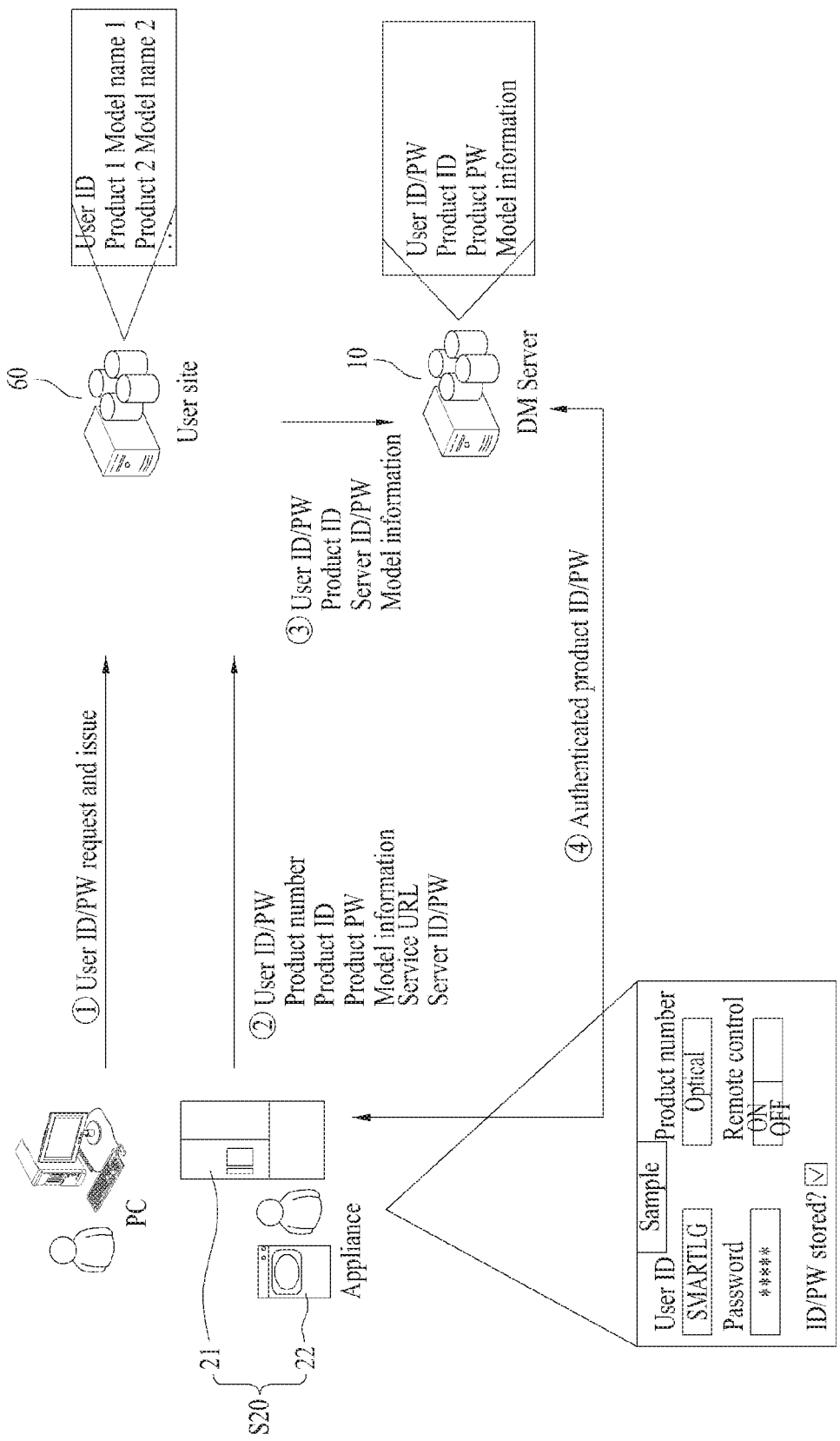
FIG. 4 is a view showing an embodiment of a member joining and activation procedure and configuration.

FIG. 4 is a view showing member joining and activation of a home appliance.

As previously described, a user may join the user site 60 as a member to receive a user ID and a password.

The home appliance activation may be a procedure of registering the home appliance 20 of the user with the server 10. A display screen of the home appliance may have a pop up window which enables the user to input the user ID, the password, etc. The user may carry out the activation procedure through the screen. When the user inputs the user ID and password to the screen and inputs an activation command, the home appliance transmits the user ID, the password, the device ID, and the characteristic information of the home appliance to the user site 60. At this time, the home appliance 20 may store the input user ID and the input password. The user ID and password may be used for user authentication.

The device ID may be previously input into the home appliance. Alternatively, the device ID may be automatically generated in the home appliance when the activation procedure is carried out. Otherwise, the device ID may be automatically generated when the home appliance is first purchased and powered on for the first time.

The characteristic information of the home appliance may include model information, a product code, a manufactured date, and a manufactured product number of the home appliance.

In addition, in the activation procedure, the home appliance may transmit the password of the home appliance, the service URL, and the server ID and password. Of the information transmitted to the user site 60 in the activation procedure, the information excluding the user ID and password may be automatically generated in the home appliance 20 or previously input in the home appliance 20.

Through the activation procedure, the user site 60 may receive the information from the home appliance 20. The user site registers home appliances corresponding to the user ID. Consequently, home appliances 20 may be registered with the user site per user ID.

Subsequently, the user site 60 transmits the user ID, the password, the device ID, and the characteristic information regarding the home appliance to the server 10. At this time, the ID and password of the server may also be transmitted.

The server 10 performs authentication of the transmitted information first. When authentication is successful, the user ID, the password, the device ID, and the characteristic information of the product are registered with the server. At this time, the password of the device may also be transmitted.

The activation procedure may be performed regardless of place under a communication environment in which accessing the server and the user site is possible. For example, a seller from whom the user has bought a product may carry out the activation procedure for the user.

(2) User Service Request

The user may request a service on a display screen of the home appliance intended to have the service provided thereto. For example, after a pop up window for a desired service is displayed on the display screen of the home appliance 20, the user ID and password may be input and then the service request may be carried out. At this time, the home appliance may also transmit the user ID, the password, and the device ID together in addition to the information regarding the service request.

In addition, the user may also request the desired service through the user site 60. The user site may have a web page provided for the user to request a management service and the user may also request the desired management service at the web page. Upon reception of the service request from the user, the user site may transmit information regarding the service request to the server system. At this time, the user ID, the password, and the device ID may also be transmitted.

In addition, the user may call a client call center to make the service request. The client call center may be configured to receive the management service through an automatic response system (ARS).

Figure 5:
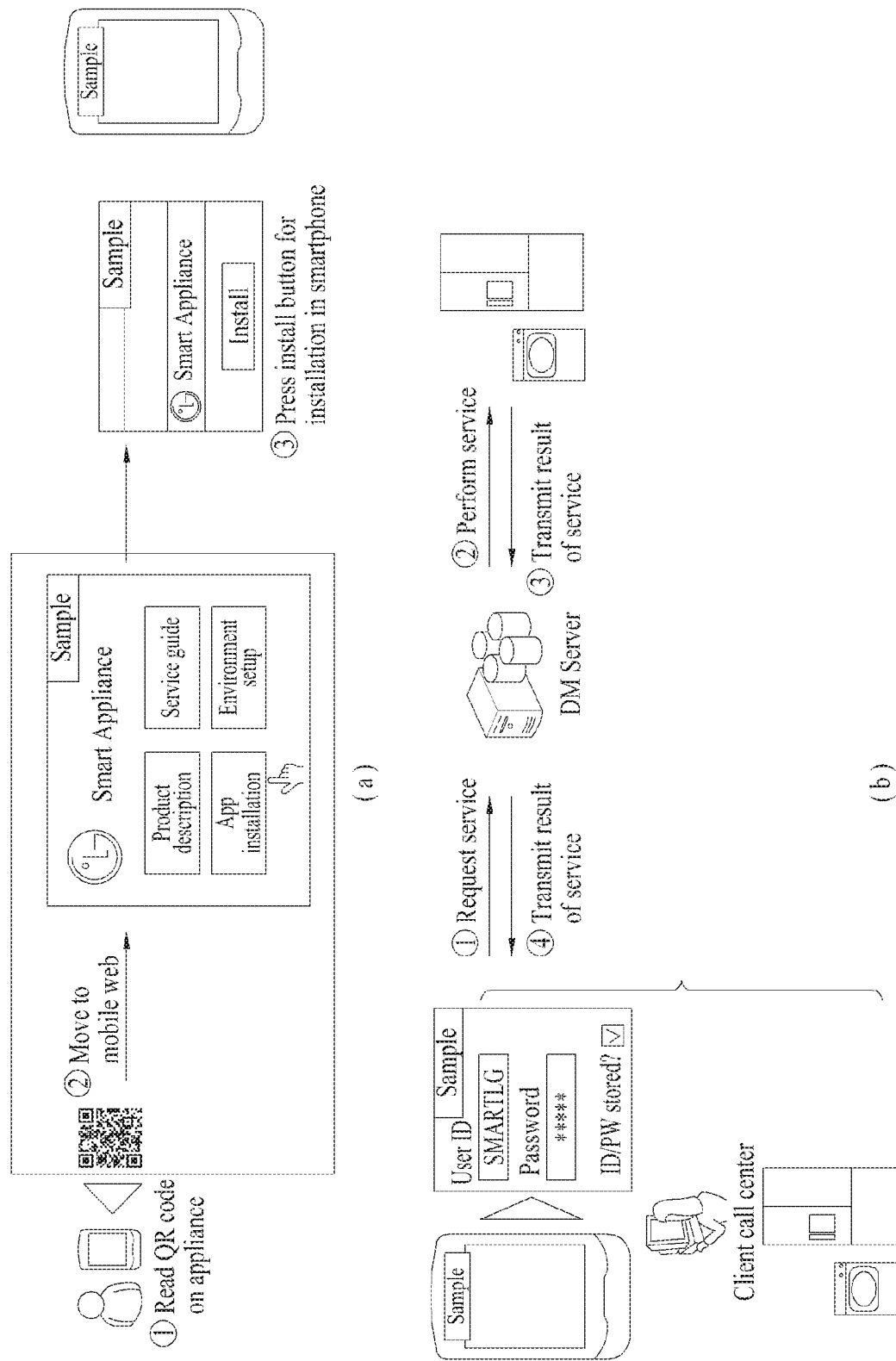
FIG. 5 is a view showing an embodiment of a procedure and configuration of an external terminal downloading an application program and a procedure and configuration of a user requesting a management service.

Meanwhile, the service request may be made through a mobile communication terminal (external terminal), such as a smartphone. FIG. 5(a) is a view exemplarily showing an example in which a smartphone application for the management service is downloaded. FIG. 5(b) is a view exemplarily showing an example in which the service request is made through the smartphone (external terminal), the client call center, or the home appliance.

In a case in which the service request is made through the smartphone, the user may put the management service application installed in the smartphone into operation, input the user ID and password, and request the service. The smartphone may transmit information regarding the service request to the server system. At this time, the user ID, the password, and the device ID may also be transmitted.

Upon requesting the remote service for the home appliance from the DM server using various methods, the DM server carries out the remote service for the home appliance.

Upon completion of the remote service, the home appliance notifies the DM server of completion of the remote service. In a case in which the service request is made through the external terminal instead of the home appliance, the DM server notifies completion of the remote service to the external terminal.

Consequently, the user may request the remote service of the home appliance and confirm the result of the remote request through the external terminal, not through the home appliance.

(3) Remote Control of Home Appliance (Product Control)

A product may be remotely controlled. The control management may be initiated by the DM server and may be operated in the background. Consequently, interaction with the user through an MMI and occurrence of an interrupt may not be considered.

For a refrigerator, a refrigerating chamber temperature, a freezing chamber temperature, an adjustable room temperature or mode (frozen food mode, meat mode, vegetable mode, etc.), express freezing control (including on/off), refrigerator operation mode control (general mode, test mode, LQC mode, display mode, smart diagnosis mode, etc.), and dispenser control (crushed ice mode, water mode, cube ice mode, etc.) may be included as control items.

For a washing machine, power on/off, operation, and stop may be included as control items. In addition, schedule change, washing course selection, washing course option selection, and steam selection may also be included as control items. Moreover, a wrinkle prevention function may be carried out after completion of the washing course. Such control management may be performed through the DM server via the open API using the smartphone application.

Figure 6:
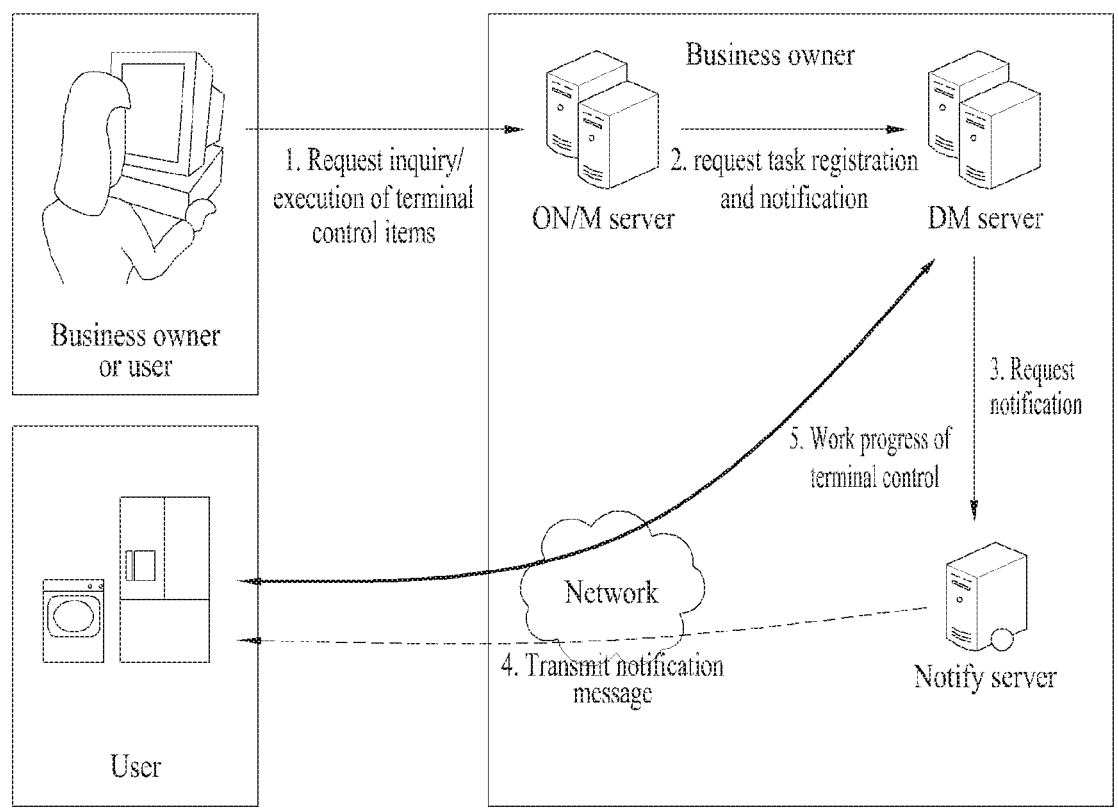
FIG. 6 is a view showing an embodiment of a firmware or software upgrade procedure and configuration.

A control management procedure, which will hereinafter be described in detail, is shown in FIG. 6.

1. Inquiry of control items/request to execute the control items: The administrator (or the user) requests a task for inquiry of control items/request to execution of the control items from the ONM server using a management screen of the ONM server.

2. Task registration and notification request: The ONM server requests the control/operation task and notification of the same to the home appliance through a notification message from the DM server.

3. Notification request: The DM server requests notification of a product from the notification server.

4. Notification message transmission: The notification server transmits a notification message to the home appliance.

5. Performance of control task: The home appliance receives the notification message from the DM Server, accesses the DM Server, and performs the control task.

The DM client of the home appliance is linked with the DM server using the OMA DM protocol and the DM client of the home appliance is linked with the control agent to perform control management.

The control management may be initiated by the DM server. The DM session mode may be executed in the background. The DM client starts to perform the control management upon reception of the notification message from the DM server.

(4) Diagnosis

Diagnosis is a service for diagnosing the home appliance. For example, when a washing machine appears to have malfunctioned, the user may request a diagnosis service. Upon reception of a diagnosis command, the washing machine may execute a diagnosis program to collect data necessary for diagnosis.

The home appliance may collect event data or log data during normal operation. Such data may be utilized as diagnosis data. That is, the diagnosis data may be collected even if there is no diagnosis request. For example, if the drum of the washing machine does not rotate, such event data may be recorded and conserved. In a case in which a diagnosis request is present, therefore, the washing machine may drive the diagnosis program together with the collected and recorded data to transmit the collected data to the server system.

For a washing machine, the diagnosis data may include data regarding a net acting ratio of a motor, data regarding power applied to the washing machine, data regarding temperature in a tub or a drum, data regarding operation of a water supply valve, and data regarding operation of a drainage valve.

For a refrigerator, on the other hand, the diagnosis data may include data regarding operation of a cooling fan, data regarding temperature of a refrigerating chamber or a freezing chamber, data regarding operation of a compressor, data regarding operation of various valves, such as an expansion valve, and data regarding operation of an ice maker.

In addition, the diagnosis data may include data regarding operation of the display unit or the input unit corresponding to the user interface and data regarding operation of a water level sensor (for the washing machine) and different temperature sensors (for example, a sensor to sense temperature in the tub of the washing machine and a sensor to sense temperature in the refrigerating chamber or the freezing chamber of the refrigerator).

The diagnosis data may include information regarding a command execution time and a data generation time. Such diagnosis data may be transmitted to the server and the server may execute an analysis program to provide a result of diagnosis.

The diagnosis request may be made through the smartphone. Alternatively, the client center may access the server system to make the diagnosis request upon user request to the client center. In addition, in a case in which an error occurs in the home appliance, error information may be transmitted to the server such that the diagnosis is performed.

The open API interface for the diagnosis may be designed to provide a start interface only. As a result, interruption of the diagnosis after start of the diagnosis may not be provided.

Figure 7:
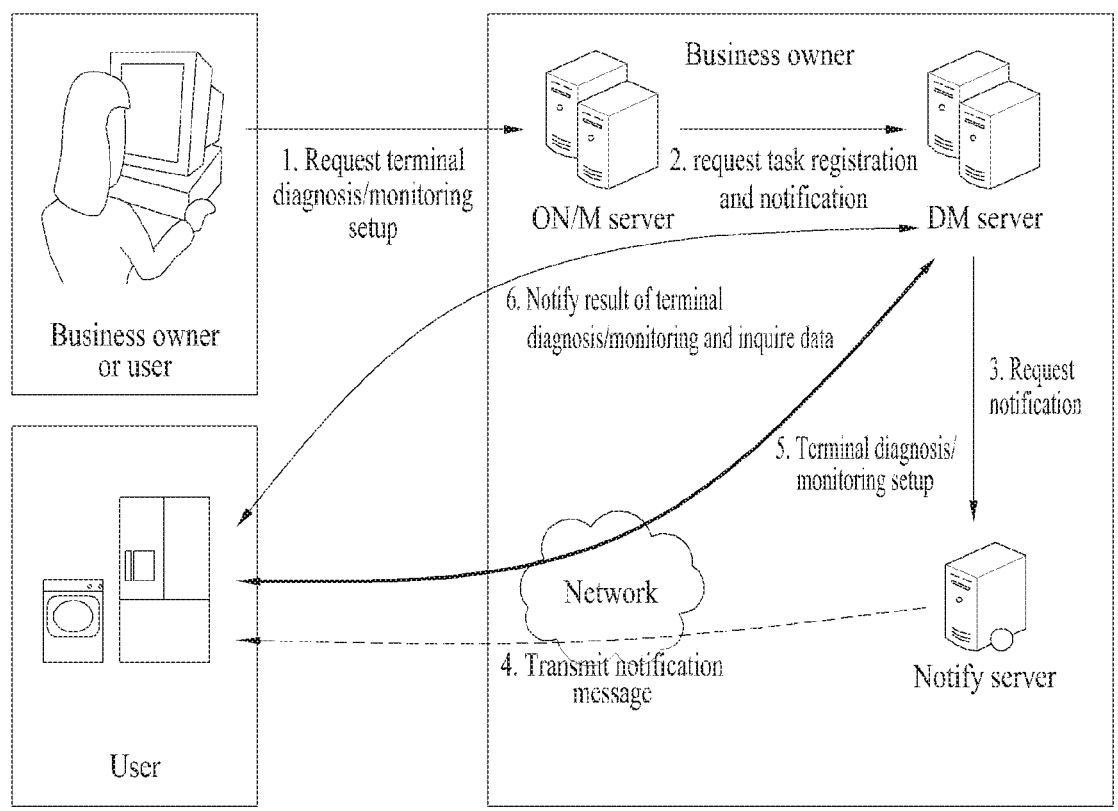
FIG. 7 is a view showing an embodiment of a procedure and configuration related to a diagnosis or monitoring management service.

FIG. 7 is a view showing a diagnosis procedure, which will hereinafter be described. Since the diagnosis procedure may be the same as a monitoring procedure, which will hereinafter be described, the monitoring procedure is also shown in FIG. 7.

1. Diagnosis/monitoring setup request: The administrator (or the user) requests conditions and start of the diagnosis/monitoring using a management screen of the diagnosis server.

2. Task registration and notification request: The management server requests the conditions and the start of the diagnosis/monitoring and notification from the DM server.

3. Notification request: The DM server requests the notification server to notify the terminal.

4. Notification message transmission: The notification server transmits a notification message to the terminal.

5. Diagnosis/monitoring setup: The DM server requests the conditions and the start of the diagnosis/monitoring from the DM client.

6. Diagnosis/monitoring result notification/inquiry data: Upon completion of the diagnosis/monitoring, the DM client (DiagMonAgent) of the terminal notifies the DM server of a result of the diagnosis/monitoring (alert message).

The diagnosis/monitoring management may be performed by the DM server or the user and the DM session mode may be executed in the background.

In a case in which the diagnosis/monitoring management is performed by the DM server, the DM client starts to perform the diagnosis/monitoring upon reception of the notification message from the DM server. On the other hand, in a case in which the diagnosis/monitoring management is performed by the user, the user starts to perform the diagnosis/monitoring on a screen of the home appliance and the home appliance executes the DM client after completion of the diagnosis/monitoring.

On the other hand, another embodiment for carrying out the diagnosis will hereinafter be described. This embodiment is related to user transmission of operation sound or diagnosis sound generated in the home appliance to the server. For example, the user may transmit the operation sound generated during operation of the home appliance or the diagnosis sound for diagnosing the home appliance to the server system through the mobile communication terminal. The server system may analyze the operation sound or the diagnosis sound to diagnose the home appliance. The user may transmit the operation sound or the diagnosis sound to the server system using a variety of methods. For example, when the user places a telephone call to the service center and transmits the operation sound or the diagnosis sound of the home appliance through a receiver of the mobile communication terminal, the service center may transmit the operation sound or the diagnosis sound to the server.

The service center may be provided with an ARS system for automatic transmission of the operation sound or the diagnosis sound. In addition, the user may use a mobile communication terminal (for example, a smartphone) having a diagnosis program installed therein. That is, it may be possible for the user to transmit the diagnosis sound to the server using the diagnosis program installed in the mobile communication terminal. At this time, the diagnosis sound may be directly transmitted to the server. Alternatively, the user site may transmit the diagnosis sound to the server upon reception of the diagnosis sound from the user.

The server system may have a program for analysis and diagnosis of the operation sound. The program may analyze the diagnosis sound data to convert the data into error code or state information. The server system may transmit a result of such diagnosis to the mobile communication terminal of the user or the home appliance.

(5) Monitoring

Monitoring is a service related to monitoring of the home appliance. Upon reception of a monitoring request, the home appliance may transmit monitoring data to the server system.

For example, upon requesting monitoring data from a washing machine, the washing machine may execute a monitoring program to collect the monitoring data, and transmit the collected monitoring data to the server. At this time, the monitoring data may include information regarding a monitoring command execution time, and a monitoring data generation time. In addition, upon requesting the performance of monitoring, the monitoring data may be repeatedly transmitted after the monitoring is initiated.

For a refrigerator, monitoring items may include an express freezing state, a hygiene filter state (for example, whether the hygiene filter state is on or off), a refrigerator operation mode, a dispenser state, an error state, a door open/closed state. For a washing machine, monitoring items may include an operation state, a remaining time of a course under operation, an initial set time, type of a washing course, a rinsing level, a spin-drying RPM, a temperature set for carrying out the course, and a scheduled washing time.

The monitoring service may be requested through the external terminal, such as the smartphone, and a result of the request may be inquired. The open API interface for monitoring may be designed to provide both start and end interfaces. The monitoring procedure may be the same as shown in FIG. 7.

As stated above, an embodiment of a home appliance, which may implement the present invention, and an online system including the same have been described with reference to FIGS. 2 to 7.

Hereinafter, a home appliance communication connection method and a configuration for the same will be described in detail with reference to FIGS. 8 and 9.

Ultimately, the home appliance 20 is required to communicate with the server 10. To this end, the home appliance 20 is required to communicate with an AP 30 installed in a house first. For this reason, the home appliance 20 is required to have a communication module equipped therein or connected thereto. Specifically, the communication module may be a Wi-Fi™ communication module 25.

First, the home appliance 20 is powered on through a power selection unit 140 provided at a control panel 100 of the home appliance 20. At this time, the Wi-Fi™ communication module 25 is also powered on.

Figure 8:
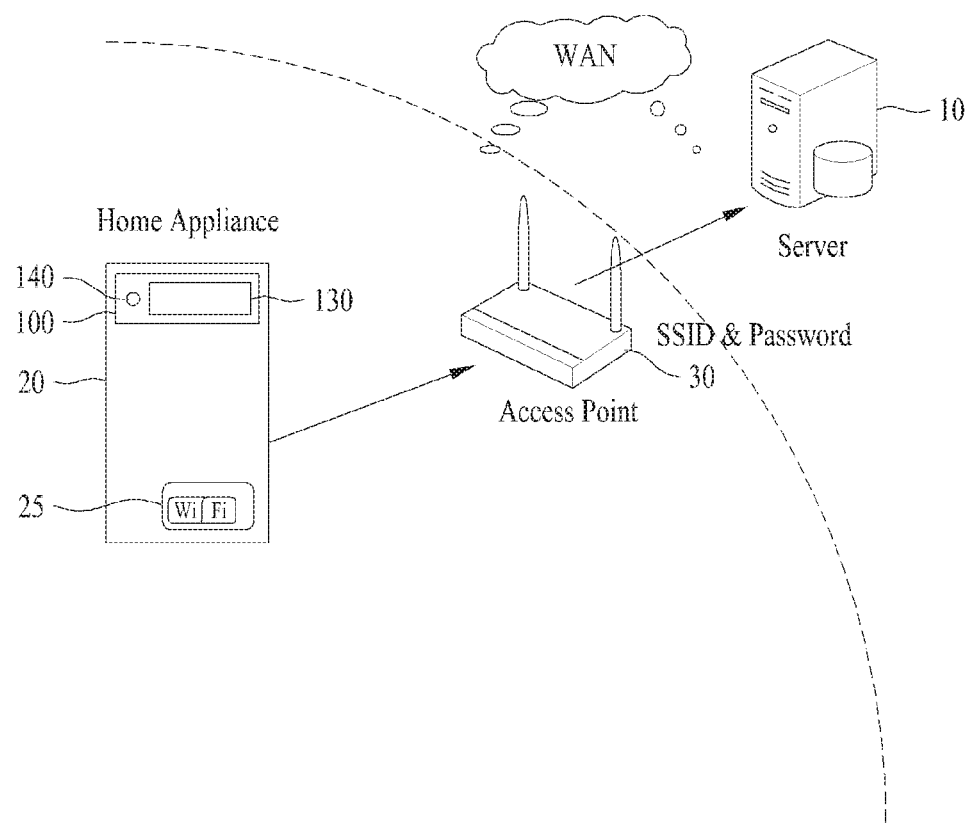
FIG. 8 is a view showing an embodiment of a procedure and configuration for communication connection of a home appliance.

As shown in FIG. 8, the control panel 100 may be provided with a state display unit 130. The state display unit 130 may be a touch display. The touch display may display all states of the home appliance such that operations and conditions may be selected by touching the touch display. In addition, text or numbers may be input through the touch display. In this case, a keypad may be displayed on the touch display such that a user may perform such input through the keypad.

Consequently, other input means or display means excluding the power button 140 to power the home appliance on and the touch display 130 may be omitted from the control panel 100. Of course, the power button 140 may be implemented to be input by touch like the touch display 130. Due to functionality of the touch display, the user may easily communication connect the home appliance to the server.

In the home appliance, particularly a laundry machine, a user interface through the touchscreen type state display unit 130 as shown in FIG. 8 may not be generally implemented. That is, the user interface as shown in FIG. 1 may be generally implemented.

Figure 1:
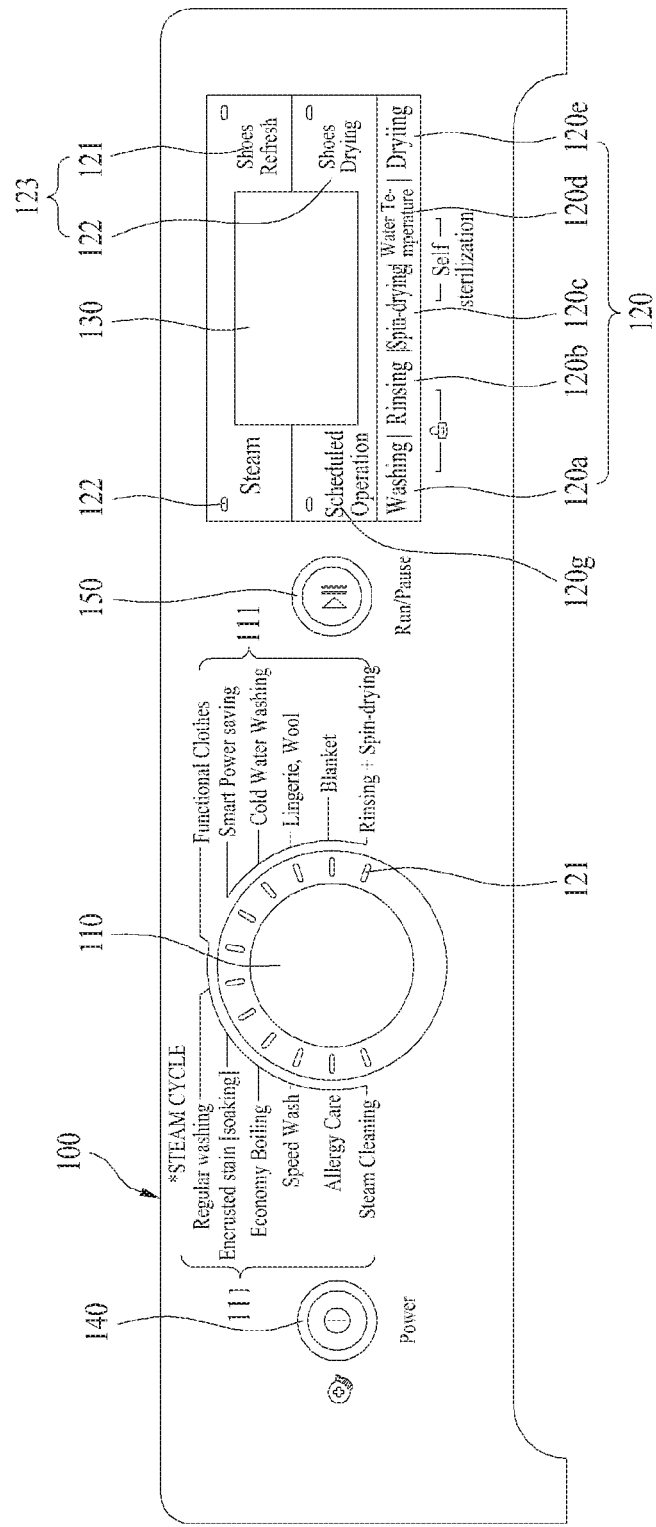
FIG. 1 is a view showing a control panel of a laundry machine, which is an example of a home appliance.

As shown in FIG. 1, many of the home appliances have no interface to allow input of text or no display unit to display a variety of screens. For this reason, the home appliance 20 may not easily communicate with the AP 30.

Figure 9:
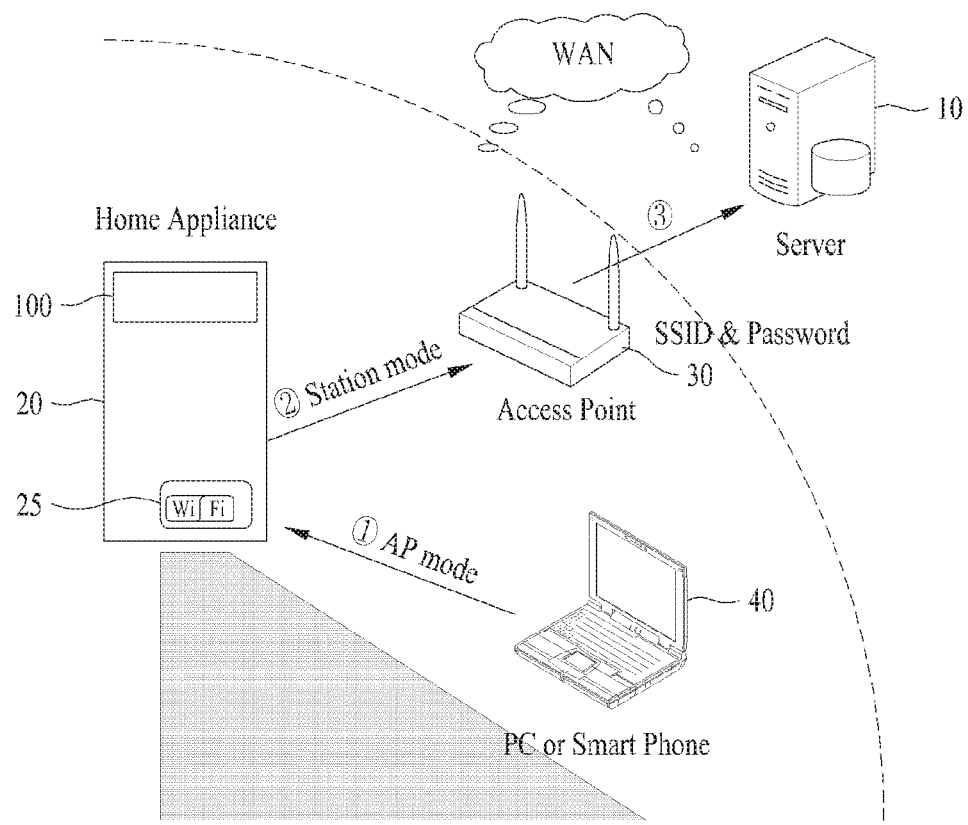
FIG. 9 is a view showing another embodiment of a procedure and configuration for communication connection of a home appliance.

Communication connection of the home appliance having the user interface as shown in FIG. 1 may be performed as shown in FIG. 9.

For communication connection of the home appliance, the Wi-Fi™ communication module 25 may support a setup mode for the communication connection and a use mode which enables communication. That is, the setup mode may be performed for communication connection of Wi-Fi™ communication module 25 and, when the Wi-Fi™ communication module 25 is communication connected in the setup mode, switching to the use mode is performed. For communication connection, therefore, the setup mode of the Wi-Fi™ communication module 25 is performed first, wherein the first metal layer is directly in contact with a bottom surface of the passivation layer.

The setup mode is a mode in which communication with the AP is possible. Consequently, the setup mode may be referred to as an AP mode. On the other hand, the use mode is a state in which the home appliance can communicate with the server through the AP, enabling transmission and reception of information to carry out the remote management service whenever required. That is, the use mode may be a standby state for carrying out the remote service. Accordingly, the use mode may be referred to as a connection mode or a standby mode.

In order to execute the setup mode, an input means may be provided at the Wi-Fi™ communication module 25. In many cases, however, the Wi-Fi™ communication module 25 may be mounted in the home appliance 20 or configured in a simple form such that the Wi-Fi™ communication module 25 may be equipped in the home appliance 20. Therefore, the input means may be provided at the home appliance.

As shown in FIG. 1, however, it is not easy to provide such an input means only for such a function at the control panel 100. This is because provision of an input means only for selection of a specific function may not be required for mass production. Furthermore, this is because carrying out the remote management service through the communication connection may not be an original function of the home appliance but an additional function of the home appliance, i.e. an option which may be added or omitted as necessary. Therefore, the setup mode may be operated by user selection of a specific input unit from among previously provided input means.

For example, the control panel 100 may be provided with a scheduled operation button 123. The user may select a washing course finishing time point while pushing the scheduled operation button 123. For example, the scheduled operation button 123 may be selected to finish the washing course after four hours. The control unit (for example, the main board shown in FIG. 3) of the washing machine may control operation of the washing machine such that, in a case in which a washing course takes two hours, the operation stops for two hours and, after two hours, the washing course is carried out.

The scheduled operation button may have a frequency of use lower than other input units. Therefore, the setup mode may be executed using the scheduled operation button. In this case, input methods of the scheduled operation button may differ. For example, a time to push the scheduled operation button may be changed to select any one from between an original scheduled operation function and a setup mode execution. That is, different functions may be selected depending on a button push time using one button.

As previously described, the Wi-Fi™ communication module may be operated in the setup mode by selecting a specific input unit, For example by pushing the scheduled operation button for 3 seconds or more. However, an additional setup means, such as a means for displaying or inputting network information that can be associated with the user information, may not be provided at the home appliance 20.

Therefore, the setup mode may be accessible through the external terminal. The external terminal may be a device including a Wi-Fi™ communication module, a text input means, a display means, a central processing unit (CPU), an operating system (OS), and a storage means. For example, the external terminal may be a laptop computer or a smartphone.

The external terminal may be provided to enable the Wi-Fi™ communication module to access the AP 30 instead of the Wi-Fi™ communication module or the home appliance. In the setup mode, therefore, information regarding a Service Set Identifier (SSID; name of a wireless LAN) of an access point (AP) 30 and user information for registration of the home appliance are received through the external terminal 40.

Accessible SSIDs are displayed on the external terminal 40 and the user selects an SSID which can be continuously connected, for example an SSID used in a house. In a case in which a wireless LAN has security enabled, the external terminal is required to select the SSID as well as to input a password thereof. Therefore, the SSID information may include an SSID password.

Upon reception of the user information and the SSID information, the Wi-Fi™ communication module is switched to the use mode. When the user information and the SSID information are input, the user information and the SSID information may be automatically stored in the communication module. Afterwards, therefore, the communication module may continuously perform communication without execution of an additional setup mode. That is, the communication module automatically accesses the AP in the use mode using such information. Accordingly, the home appliance 20 may perform wireless LAN communication with the specific AP 30. That is, a short range communication is possible.

Meanwhile, the communication module has an address of the server 10 that the communication module intends to access or an address of the user site. The server address or the user site address may be a fixed IP. In the use mode, therefore, the home appliance 20 may communicate with the server 10 through the AP 30. At the time of switching to the use mode, therefore, the user information and the product information previously stored in the home appliance may be automatically registered with the server 10 through the AP. The user site may be used to authenticate the user information and the product information transmitted to the home appliance.

The user information may be information previously stored in the server 10 through the user site. Accordingly, the server 10 compares the user information and the product information previously stored in the server 10 through the user site 60 with the information received at the time of switching to the use mode and stores a result of comparison. As a result, the server 10 recognizes a specific user and a specific home appliance of the specific user. In particular, the server 10 may recognize the location of the specific home appliance.

Meanwhile, the Wi-Fi™ communication module 25 has a fixed address for the setup mode execution. Through input of the fixed address, the external terminal 40, such as the smartphone or the laptop computer, may access the setup mode. That is, the external terminal 40 may access a web of a Wi-Fi™ modem setup mode of the home appliance. For example, the fixed address may be designated in the form of 192.1.xx.xx. The external terminal 40 accessing the setup mode means that the input means and the display means of the communication module 25 can be extended using the external terminal 40.

Upon accessing the web of the setup mode, a product registration page (for example, FIG. 12) is displayed and the user may register the product with the server by inputting required information through the product registration page.

Consequently, the user may easily switch the mode of the communication module 25 from the setup mode to the use mode through the external terminal 40. This means that such switching can be achieved without addition of hardware, such as an additional input unit or an additional display unit, to the home appliance 20 or modification of the home appliance 20. In addition, the use of the separately provided external terminal 40 may prevent the increase in cost of the home appliance.

Figure 10:
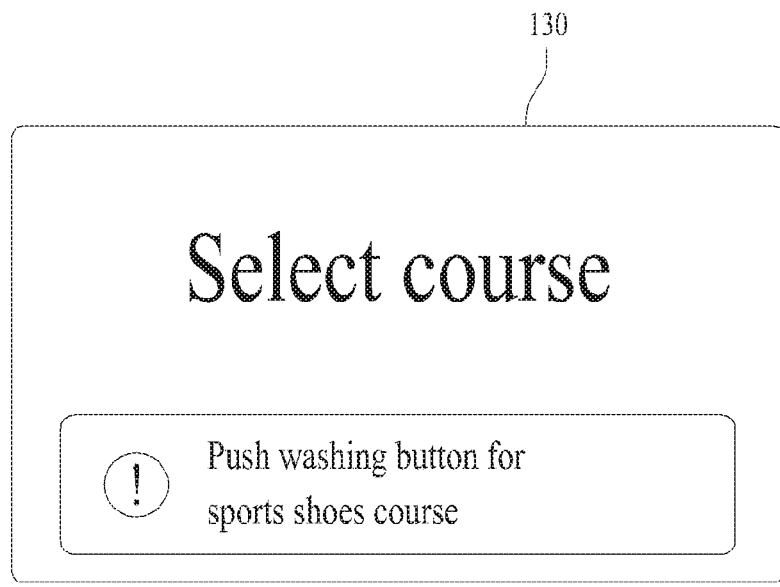
FIG. 10 is a view showing an embodiment of an initial screen of a display unit of a home appliance.

As shown in FIGS. 1 and 10, the home appliance 20 may include a state display unit 130. Consequently, the user may easily recognize accessing the setup mode and switching to the use mode through the state display unit 130, which will hereinafter be described.

Upon pushing the power selection unit 140, the state display unit 130 may display a guide message for selection of a washing course as shown in FIG. 10. That is, the home appliance displays a guide message requesting user selection. Of course, such a guide message may be a message initially displayed upon application of power. In other words, such a guide message may be a message displayed on an initial screen.

Figure 11:
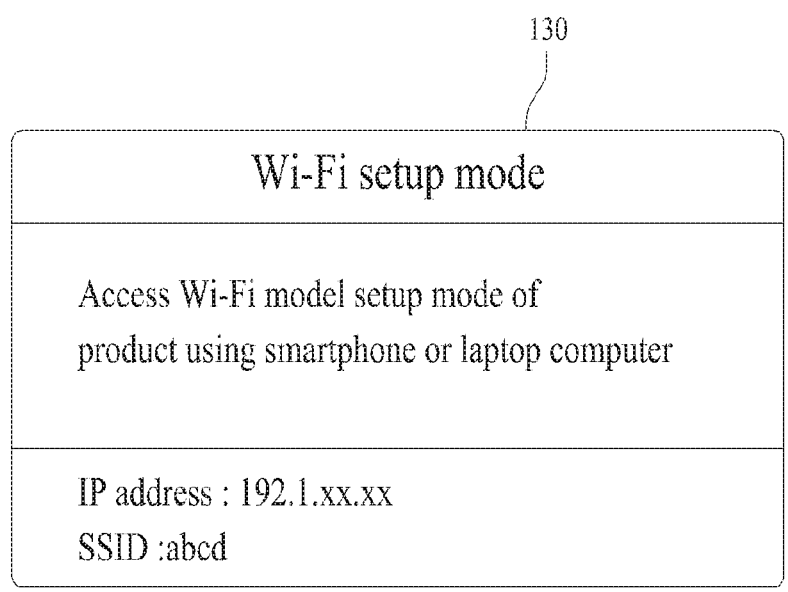
FIG. 11 is a view showing an embodiment of a screen of a display unit of a home appliance in a Wi-Fi™ setup mode.

Subsequently, upon execution of the setup mode, the state display unit 130 may display that the Wi-Fi™ setup mode is being executed as shown in FIG. 11. As previously described, execution of the setup mode may be carried out by selection of a specific selection unit. For example, the setup mode may be executed by pushing the scheduled operation button 123 for 3 seconds or more. The user may clearly recognize through the state display unit 130 that an operation corresponding to a command is being carried out.

In addition, at least one selected from between the fixed address for accessing the setup mode and information regarding the SSID to be connected may be displayed on the state display unit 130 in the setup mode. Therefore, the user may easily input the fixed address to the external terminal 40 or access the SSID of the communication module through the external terminal 40.

Figure 12:
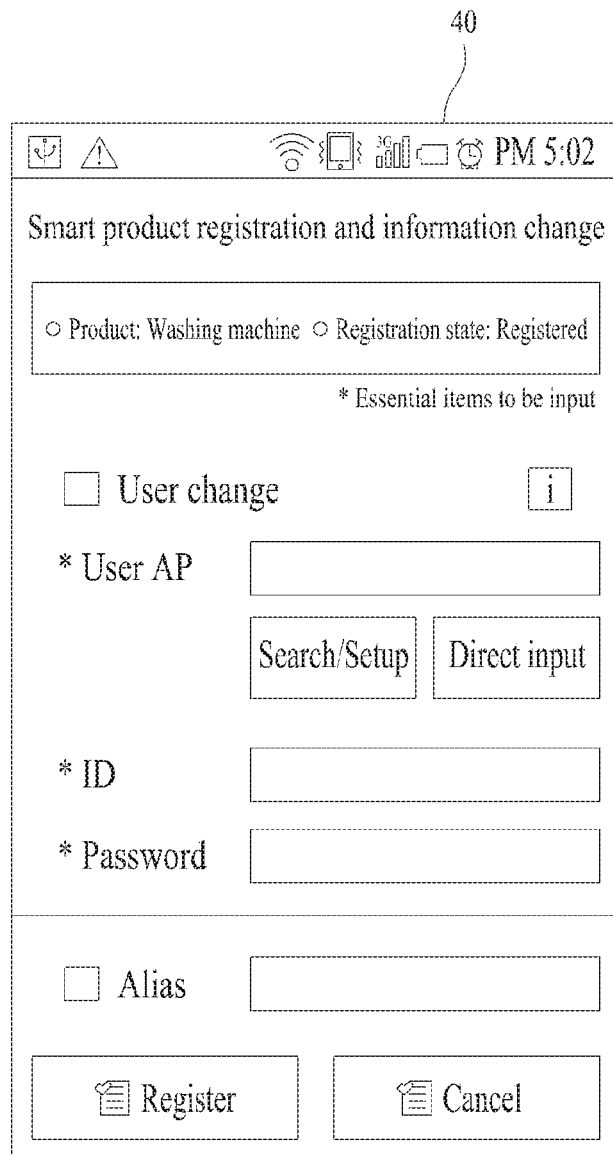
FIG. 12 is a view showing an embodiment of a screen of an external terminal when the external terminal access a setup mode.

An example of a screen on which the setup mode is accessed by inputting the fixed address to the external terminal 40 is shown in FIG. 12. Specifically, FIG. 12 shows a screen on which the user AP, i.e. the SSID information (SSID name and/or SSID password) for access, and the user ID and password can be input.

The user ID and password may be information previously set through the user site 60. When such information is input, therefore, the home appliance 20 is registered with the server 10.

The external terminal 40 may access the web page of the setup mode only in a state in which the setup mode of the home appliance 20 is activated. This is necessary in order that the home appliance that the user intends to connect to the server is the home appliance that the user actually wishes to connect.

Specifically, as the smartphone inputs the fixed address of the communication module of the home appliance 20 in a state in which the setup mode of the home appliance 20 is activated, the communication connection between the smartphone and the home appliance may be performed. Accordingly, the home appliance may receive user AP information to be connected to the user information through the smartphone and may be connected to the AP therethrough. When the home appliance is connected to the AP, the home appliance is switched to the user mode. At this time, the home appliance is normally registered with the server through the authentication procedure at the server or the user site.

In addition, the smartphone may directly access the communication module of the home appliance 20 in a state in which the setup mode of the home appliance 20 is activated. That is, the smartphone may access the SSID shown in FIG. 11. In other words, connection of the smartphone to the Wi-Fi™ network (for example, 'abcd' shown in FIG. 11) of the communication module in the home appliance 20 may be possible. When the Wi-Fi™ connection between the smartphone and the home appliance is performed, the screen shown in FIG. 12, i.e. the setup mode web page, may be displayed on the smartphone, through which actual connection of the home appliance to the user AP in the house is possible.

Figure 13:
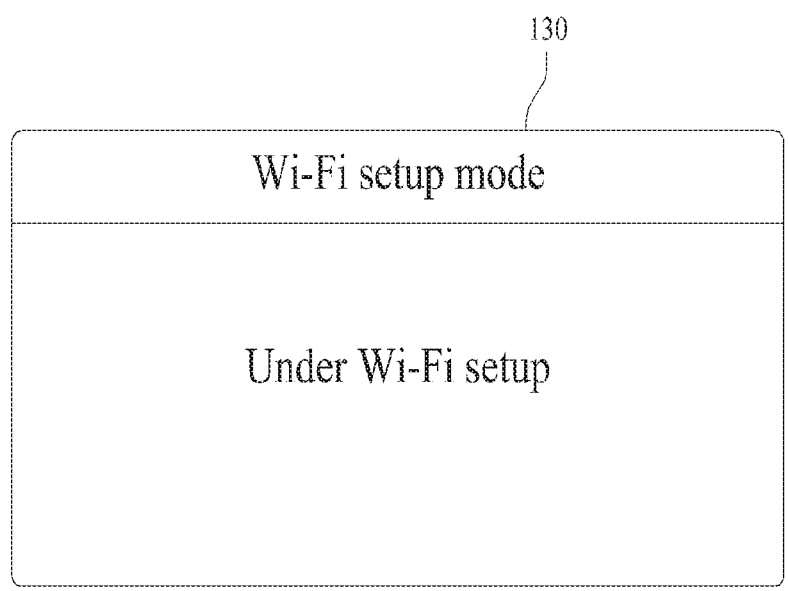
FIG. 13 is a view showing an embodiment of a screen of a display unit of a home appliance when an external terminal access a setup mode.

Meanwhile, upon inputting the fixed address to the external terminal 40 or inputting the user information and the AP information after the external terminal 40 accesses the Wi-Fi™ network of the home appliance 20, a screen shown in FIG. 13 as an example may be displayed on the state display unit 130 of the home appliance 20. The home appliance, particularly the Wi-Fi™ communication module 25, attempts to access the user AP using the information received through the smartphone. Therefore, information that the Wi-Fi™ connection is being established may be displayed on the state display unit 130

Under such Wi-Fi™ setup, the home appliance 20 may carry out mutual authentication procedure with the server or the user site. Upon completion of the Wi-Fi™ setup, therefore, the home appliance may be registered with the server directly or through the user site.

Figure 14:
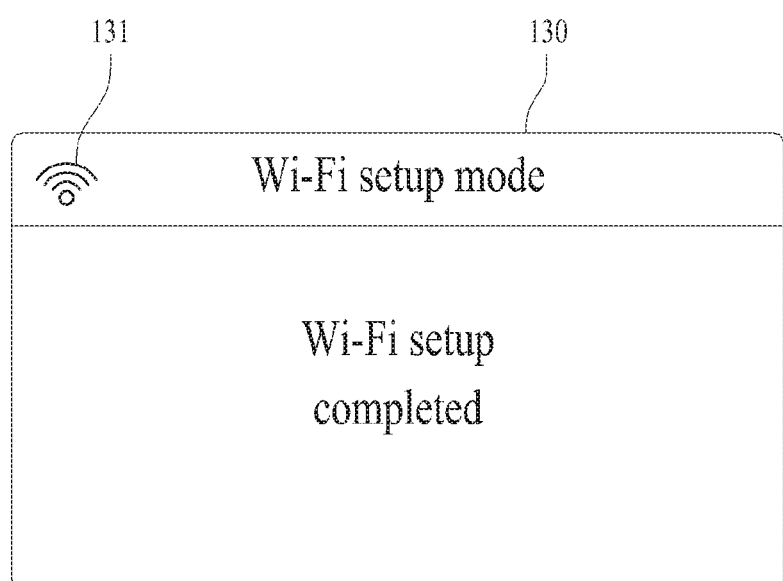
FIG. 14 is a view showing an embodiment of a screen of a display unit of a home appliance when a setup mode is ended.

Upon completion of the Wi-Fi™ setup mode, the screen shown in FIG. 13 may be switched to a frame shown in FIG. 14 as an example. That is, information that Wi-Fi™ setup has been ended is displayed and, in addition, a Wi-Fi™ icon may be displayed. The Wi-Fi™ icon may be continuously displayed as long as the communication connection is active.

Through such processes, the user may easily register the home appliance with the server and connect the home appliance to the server through the user AP.

When a set time of, for example, three seconds, elapses, the screen of FIG. 14 may be switched to the initial screen, i.e. the screen of FIG. 10. Of course, the Wi-Fi™ icon 131 may be added to the screen of FIG. 10 to indicate that Wi-Fi™ is under connection.

The user may easily and rapidly register the home appliance with the server 10 based on such characteristics of the state display unit 130 of the home appliance and the Wi-Fi™ module in the home appliance such that the user may use a remote service afterwards. In a case in which such communication connection is achieved, the communication connection may be automatically performed when the home appliance is powered on afterwards.

Meanwhile, the external terminal 40 may be used not only as an auxiliary means for communication connection of the home appliance but also a management service for the home appliance may be easily performed using the external terminal 40. In the same manner, an extended input means and display means of the external terminal 40 may be utilized.

For request of a remote service for the home appliance through the external terminal 40, the external terminal 40 may be provided with an application for requesting and carrying out at least one selected from among remote control, remote diagnosis, firmware or software update, and monitoring of the home appliance 20.

When the application is initially executed, the user information is transmitted to the server and the external terminal communicates with the home appliance corresponding to the user to perform the service requested by the home appliance. Meanwhile, the application may indicate products capable of utilizing a remote service. The application may be provided such that products actually owned by the user are selected from among the products. In a case in which user's products have not been registered with the server, the products may be registered with the server through the application.

Hereinafter, performance of a remote service, particularly remote control, through the application will be described in detail.

Figure 15:
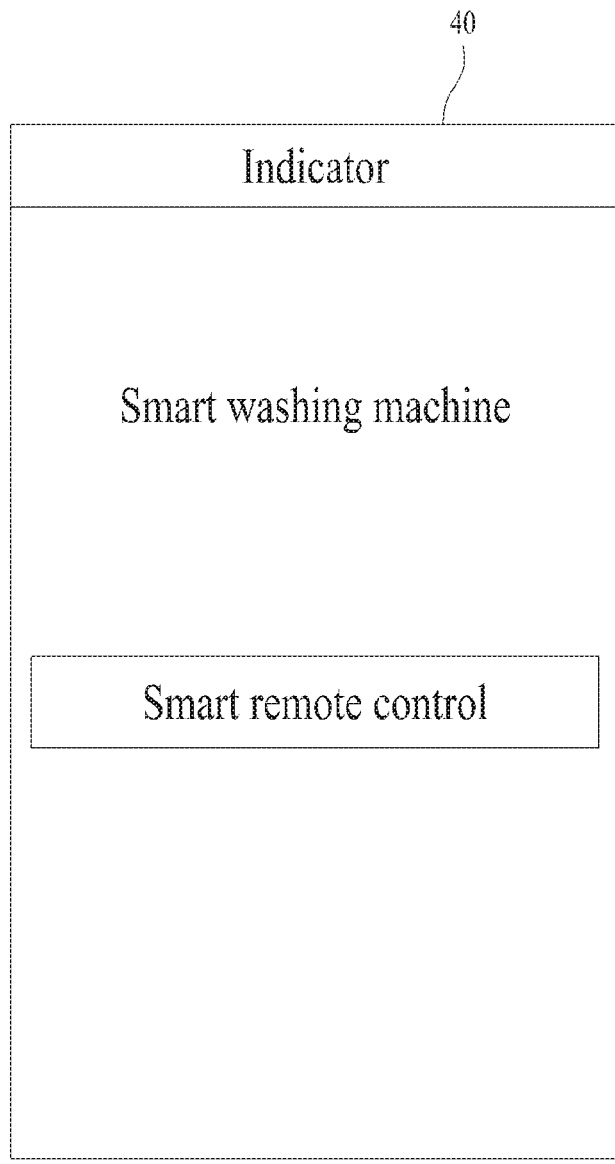
FIG. 15 is a view showing an embodiment of an initial screen for remote management of a home appliance through an external terminal.
Figure 16:
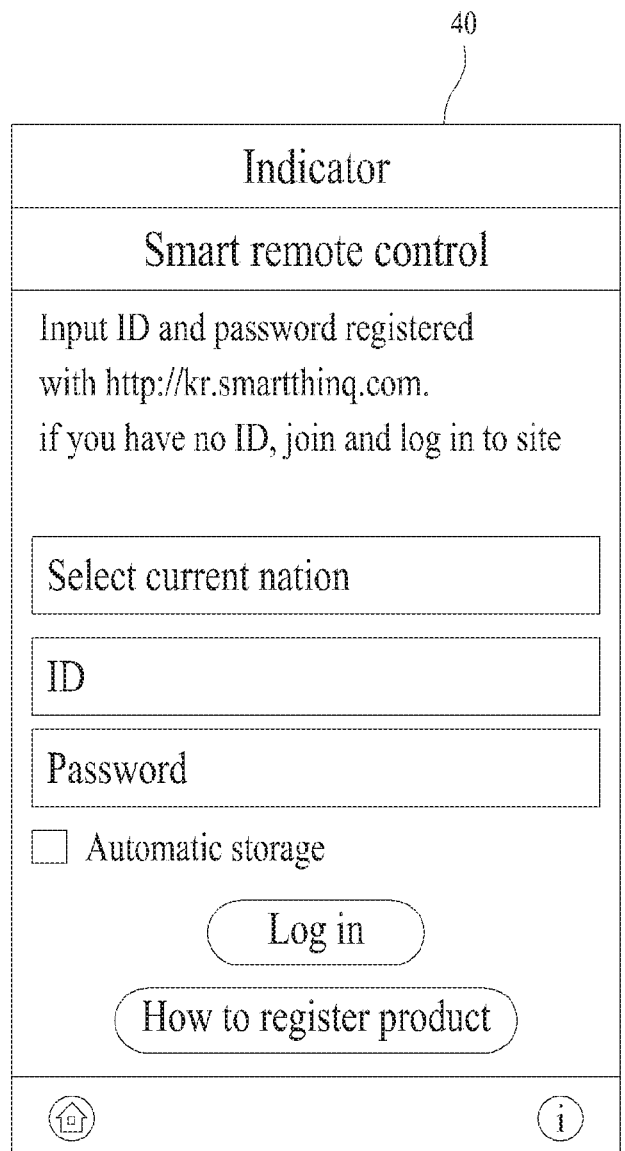
FIG. 16 is a view showing an embodiment of a login screen of an external terminal.

Upon execution of the application, first, a screen shown in FIG. 15 as an example may be displayed on the external terminal. When the user pushes a remote control menu (smart remote control), a screen to log in to the server is displayed. An example of the screen to log in to the server is shown in FIG. 16. The user may access the server by selecting a country (server) and inputting a user ID and password, i.e. by selecting a login menu.

The server selection may be displayed only in a case in which any one is selected from among a plurality of servers. In addition, the screen may be displayed for selection of a language to be used.

The login screen may be displayed only at initial login, and the login screen may be automatically displayed afterwards. However, since other persons may arbitrarily execute the application, login may be performed upon reception of at least the user password each time the application is executed.

After login, the server determines whether the user has been registered with the server. Upon determining that the user has not been registered with the server, the external terminal may display the user site for request of registration or may be directly connected to the user site. Of course, the user site may also be displayed on the login screen.

Upon determining that the user has been registered with the server, the server may determine whether the user's home appliances have been registered with the server. Therefore, the external terminal displays any home appliances registered with the server. If plural home appliances are registered, the user may select a specific one of the home appliances to be served. For example, in a case in which a washing machine and a drying machine of the user have been registered with the server, the user may select the washing machine to remotely control the washing machine. On the other hand, the user may select the drying machine to remotely control the drying machine. Afterwards, the user may request a remote service for the specific product through the application.

In a case in which the user's home appliances have not been registered with the server, on the other hand, the user may register the home appliances with the server by selecting a product registration method menu shown in FIG. 16. The registration procedure may be the same as the above-mentioned procedure.

The application may be provided for a specific product group, for example a laundry machine (a washing machine, a drying machine, a refresher, etc.). In addition, the application may be provided for a specific product, for example a washing machine. Therefore, the user's execution of the application may mean service request for a specific product group or a specific product. When the user executes the application, therefore, user information of the specific product group or the specific product may be input to log in to the server. After login, therefore, the server determines whether the home appliance has been registered with the server together with the user information.

Figure 17:
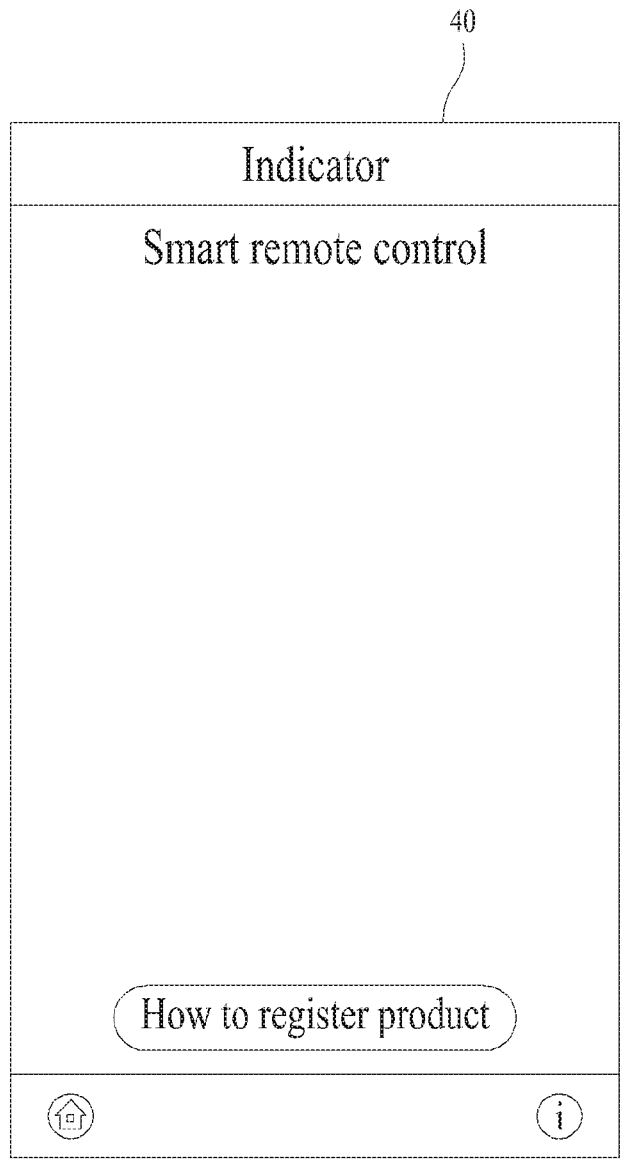
FIG. 17 is a view showing an embodiment of a screen in a case in which a home appliance is not registered with a server.

In a case in which the product related to the application has not been registered with the server after the user login, no product is displayed as shown in FIG. 17 as an example. Consequently, product registration may be possible even through this screen. Of course, in a case in which only a washing machine has been registered with the server, the registered washing machine may be displayed. On the other hand, in a case in which a plurality of products has been registered with the server, the registered products may be displayed. The user may touch a home appliance which acquires a remote service to request the remote service of the touched home appliance.

User selection of the product registration method shown in FIGS. 16 and 17 means that the user accesses the home appliance setup mode as described above. That is, the Wi-Fi™ communication module of each home appliance may have a fixed address of the setup mode and user selection of the product registration method means that the application accesses the fixed address. Of course, in order to access the setup mode of the home appliance, the setup mode of the Wi-Fi™ communication module of the home appliances is executed. Particulars related to the external terminal and the state display unit 130 of the home appliance, communication connection of the home appliance, and registration of the home appliance with the server may be the same as those previously described with reference to FIGS. 9 to 14.

Meanwhile, it is important for the server to confirm the owner and location of the product at the time of registration of the product with the server. At the time of the product registration, therefore, it is necessary to transmit the user information to the server. In addition, it is also necessary to transmit information regarding the AP address to the server. Accessing the setup mode of the Wi-Fi™ communication module may be performed to match the user information with the product. For this reason, signal transmission and reception between the external terminal and the home appliance need not be performed.

For example, the home appliance may find the user AP through execution of the setup mode.

The AP information, the home appliance information (for example, whether the home appliance is a washing machine), and the user information may be transmitted to the server or the fixed address site through the external terminal. Therefore, the server may confirm whose home appliance and what kind of home appliance the home appliance intending to connect to the specific AP is from such information. The user information may be transmitted to the communication module and stored in the communication module.

As a result, protocol setup or addition of hardware for signal transmission and reception between the communication module of the home appliance and the external terminal is not required. Therefore, the home appliance may be easily registered with the server without additional cost.

Of course, as previously described, it may also possible for the communication module of the home appliance 20 to receive only a signal through the smartphone. That is, the communication module may simply receive the user information and the user AP information through the smartphone and may be connected to the server based on the user information and the user AP information. Similarly, even in this case, protocol setup or addition of hardware for signal transmission and reception between the communication module and the external terminal is not required.

This means that the home appliance 20 is not directly remotely controlled through the smartphone by direct communication of the home appliance 20 with the smartphone. That is, this means that the smartphone communicates with the server but does not directly communicate with the home appliance. In other words, this means that the remote management service is carried out through the server. As a result, the home appliance 20 does not require a means for communication with the external terminal, such as the smartphone and thus the increase in cost of the home appliance may be prevented. In addition, the server may perform management of various home appliance histories and user carriers, information accumulation and renewal, user taste analysis, etc. Accordingly, a customized service may be provided and the information may be used in a variety of forms.

The user may more easily register the home appliance with the server using the application. In addition, a variety of management services as described above may be carried out using the application.

As stated above, the method or procedure for registering the user and the home appliance with the server and characteristics of the home appliance and the online service for the same have been described in detail.

Hereinafter, an embodiment in which the online service for the home appliance is implemented using the external terminal after the user and the home appliance are registered with the server will be described in detail. In particular, an embodiment related to remote control of a washing machine will be described in detail.

For a home appliance, such as a washing machine, unconditional remote control is not desirable. This is because remote control is meaningless in a case in which the washing machine is not ready to operate, for example in a case in which a door of the washing machine is open or in a case in which no detergent is introduced into the washing machine. In addition, since the user does not directly manipulate the washing machine, confusion between the user who remotely controls the washing machine and another user who directly manipulates the washing machine may occur. Furthermore, an unexpected accident due to remote control may occur.

Generally, several persons commonly use a home appliance, such as a laundry machine. As a result, confusion between a user interface through the direction manipulation of the laundry machine and a user interface through the remote control of the laundry machine may occur. For example, one person may remotely control the laundry machine and another person may directly manipulate the laundry machine.

In addition, when the laundry machine will be directly manipulated, the laundry machine may be abruptly operated through the remote control with the result that an accident may occur. This is because the remote control does not simply drive software but drives hardware, such as a drum, a water supply valve, a heater, etc. of the laundry machine.

For this reason, a method of preventing confusion between users who simultaneously use one home appliance and improving safety of the home appliance may be needed.

Hereinafter, a preferred embodiment of the present invention that is capable of preventing confusion between users and improving safety while implementing remote control will be described in detail.

In order to solve the above problems and to selectively perform the remote control, the washing machine may be provided with a remote control selection unit. In a case in which the remote control is selected, such information may be transmitted to the server. Of course, in a case in which the user requests the state information of the washing machine through the application, the user may receive the information from the server.

In simple terms, remote control means control of the washing machine through an application of an external terminal, such as a smartphone. For easy remote control, a server may be provided between the smartphone and the washing machine.

Figure 18:
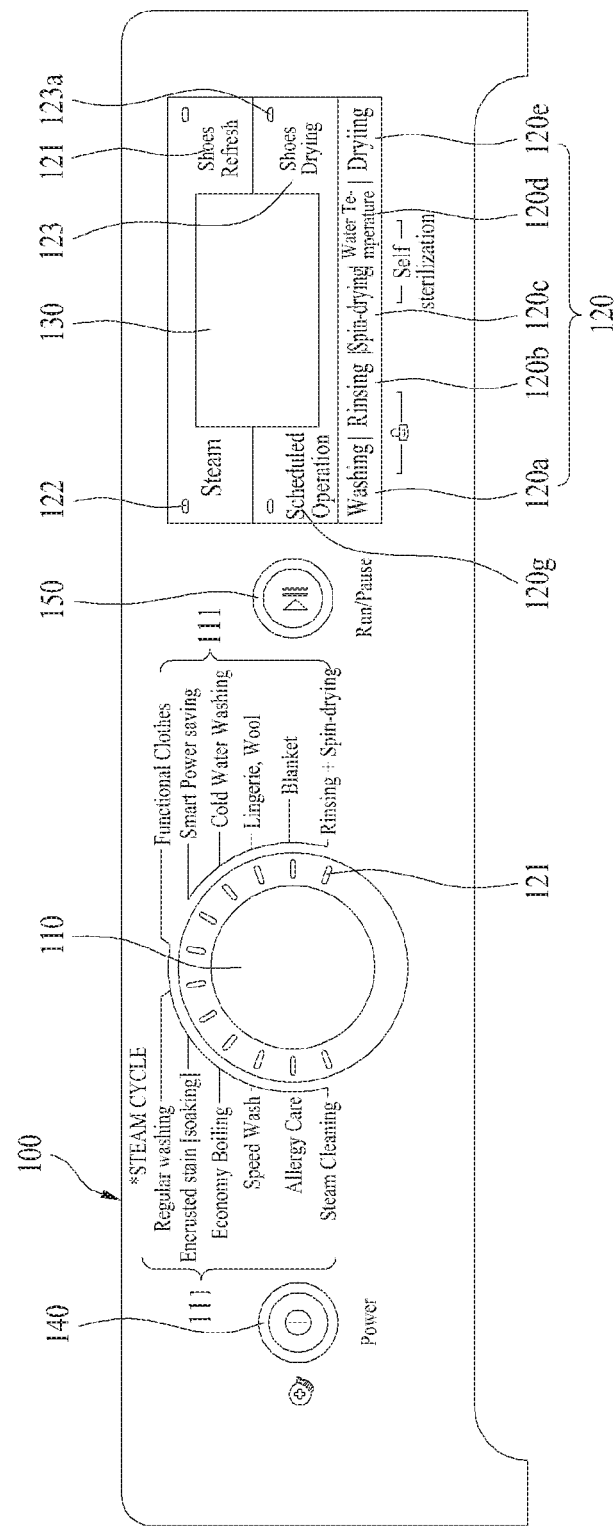
FIG. 18 is a view showing a control panel of a home appliance according to an embodiment of the present invention.

A control panel 100 applicable to this embodiment is shown in FIG. 18. The control panel 100 of FIG. 18 is very similar to the control panel 100 of FIG. 1. Consequently, the structure and hardware of the control panel may be used without change with the result that manufacturers, who manufacture various models of the washing machine, may reduce manufacturing cost per product.

The home appliance according to this embodiment includes a remote service activation input unit 123. The remote service activation input unit 123 may be provided at the control panel 100. Consequently, whether remote control will be performed may be directly selected by the home appliance and, only in a case in which the remote control is selected, the remote control may be performed.

The remote service activation input unit 123 may be configured in the form of a button. In order for the user to intuitively confirm a function of the remote service activation input unit 123, a message "SMART" may be displayed on the remote service activation input unit 123. Consequently, the user may set or cancel remote service activation through the remote service activation input unit 123.

Remote service activation may mean a state in which a remote service is received from the server 10 through the external terminal 40, not through the home appliance. That is, remote service activation may mean a state in which the home appliance can be remotely controlled through the external terminal 40.

Setup of the remote service activation is direct input of user intention to perform remote control. Consequently, such user intention may be displayed through the home appliance. This is provided to enable another user to easily confirm a remote service activation state through the home appliance, thereby preventing confusion between the two users.

For example, when another user will use the home appliance without confirmation of the remote service activation state, the home appliance may be driven through remote control. On the other hand, another user may use the home appliance before the home appliance is driven through remote control.

As a prerequisite for remote control, therefore, the remote service activation input unit 123 may be provided. Of course, when the remote service activation is set, the remote service activation state may be effectively displayed on the home appliance. The remote service activation input unit 123 may be an input unit provided only for setting and cancellation of the remote service activation.

Setting and cancellation of the remote service activation must be input according to user intention, not user error. In other words, unintended input must be prevented. Consequently, setting and cancellation of the remote service activation may be input using a method stricter than input through a course selection unit or an option selection unit.

When the user powers the home appliance on through the power selection unit 140, an initial screen as shown in FIG. 10 may be displayed on the state display unit 130. The user may set remote service activation through the remote service activation input unit 123. Of course, the user may cancel the remote service activation through the remote service activation input unit 123 after the remote service activation is set.

Input through a general option selection unit 120 may be performed by simply pushing a button. That is, input may be performed irrespective of length of a push time. However, input through the remote service activation input unit 123 may be performed based on a strong intention of the user. To this end, in a case in which the remote service activation input unit 123 is configured in the form of a button, only when the button is pushed for a longer time, for example three seconds or more, than other input units are pushed.

On the other hand, it may be necessary to indicate that the remote service activation input unit 123 is being normally operated in a state in which the remote service activation input unit 123 is pushed irrespective of length of the push time. To this end, an indication unit 123a connected to the remote service activation input unit 123 to emit light may be provided.

When the user starts to push the remote service activation input unit 123 in a state in which remote service activation is canceled, the indication unit 123a emits light. When the remote service activation input unit 123 is pushed, for example, for three seconds or more, a screen shown in FIG. 19, which will hereinafter be described, may be displayed on the state display unit 130.

Figure 19:
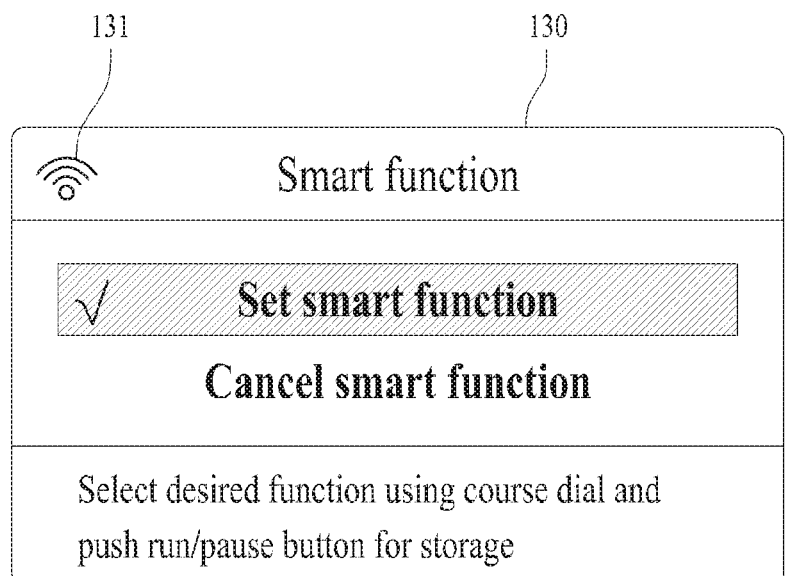
FIG. 19 is a view showing an embodiment of a screen of a display unit of a home appliance to set or cancel remote control activation in the home appliance.

Emission of light from the indication unit 123a may be continued until the remote service activation is canceled. That is, the indication unit 123a emits light until the screen shown in FIG. 19 is displayed and the remote service activation is set. In a state in which the remote service activation is set, emission of light from the indication unit 123a may be continued until the remote service activation is canceled.

When the user starts to push the remote service activation input unit 123 in a state in which remote service activation is set, on the other hand, the indication unit 123a does not emit light. Consequently, when the user starts to push the remote service activation input unit 123 irrespective of whether the remote service activation is set or canceled, a state in which the indication unit emits light may be changed into a state in which the indication unit does not emit light or a state in which the indication unit does not emit light may be changed into a state in which the indication unit emits light. As a result, the user may intuitively confirm that the remote service activation input unit 123 is being normally operated. In this way, the input method of the remote service activation input unit 123 is different from other input methods, thereby preventing confusion between users.

Meanwhile, as shown in FIG. 18, a washing button 120a and a rinsing button 120b may be simultaneously pushed to select button locking. That is, the button locking is a hidden input unit. As a result, children cannot manipulate buttons.

In the same manner as selection of button locking, the remote service activation input unit 123 may be implemented as a hidden input unit. That is, the remote service activation input unit may be provided to select an original function thereof and, in addition, may be configured to set or cancel remote service activation using another input method.

For example, a hidden input unit of a self sterilization course including a spin-drying button 120c and a water temperature button 120d may be replaced by the remote service activation input unit 123. That is, the two buttons to select options for spin-drying and water temperature may be simultaneously pushed such that remote service activation can be set or canceled using another input method.

Consequently, the user may clearly recognize which function of the home appliance is performed through input of remote service activation and input the remote service activation with a strong intention of the user.

When the user selects the remote service activation input unit 123, a screen as shown in FIG. 19 may be displayed on the state display unit 130. That is, a menu to select setting or cancellation of remote service activation may be displayed. The user may select one of the two menu items by manipulating a course indication unit 110. Alternatively, the user may select one of the two menu items by pushing a run/pause input unit 150.

That is, when the user selects the run/pause input unit 150 in a state shown in FIG. 19, a smart function (remote service activation) may be set. Consequently, the user may clearly recognize and select setting and cancellation of the remote service activation through the remote service activation input unit 123 and the state display unit 130. Of course, in a case in which the state display unit 130 is a touchscreen, setting and cancellation of the remote service activation may be selected by simply touching the menu.

Figure 20:
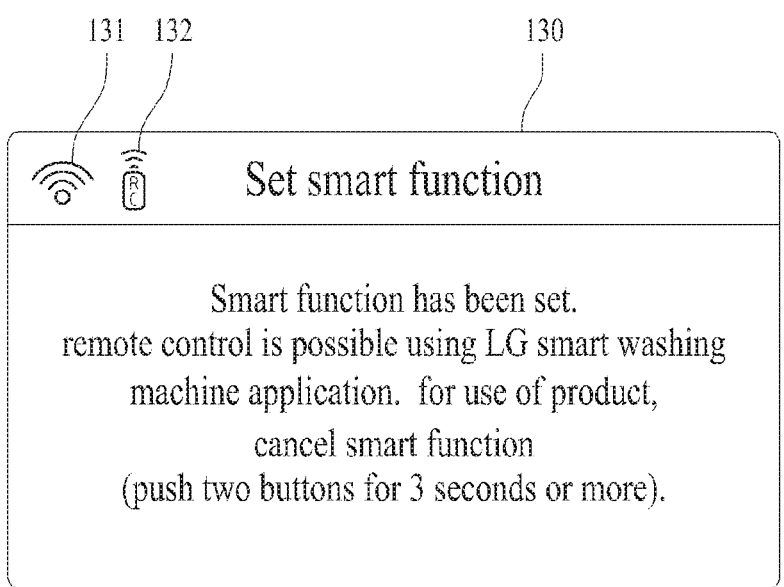
FIG. 20 is a view showing an embodiment of a screen displaying a state in which remote control activation is set.

When the remote service activation is set, setting of the remote service activation may be displayed on the state display unit 130 as shown in FIG. 20. Consequently, the user may clearly recognize that the remote service activation can be set through remote control. In addition, as shown in FIG. 20, a guide may be provided for how to cancel the remote service activation.

Meanwhile, the screen shown in FIG. 20 may be continuously maintained until a remote control command is issued. Consequently, a user other than the user who wishes to perform remote control may easily confirm the current state of the home appliance. In addition, when the remote service activation is set, a remote control icon 132 indicating that remote control is possible may be displayed on the state display unit 130. The remote control icon 132 may include "RC", i.e. an abbreviation of "Remote Control", by which the user may intuitively confirm whether remote control is possible.

When the remote service activation is set, setting of the remote service activation may be displayed on the home appliance in a variety of forms. The user may intuitively confirm a state in which the remote service activation is set through various displays, such as the emission of light from the indication unit 123a, the guide message on the state display unit 130, and the remote control icon 132 of the state display unit 130. Consequently, another user approaching the home appliance may confirm this state and may be prevented from manipulating the home appliance. As a result, confusion between the users does not occur.

Meanwhile, remote control is performed based on communication connection of the home appliance. Only in a state in which the home appliance is communication connected to the server, therefore, remote service activation may be set. Consequently, in a case in which input through the remote service activation input unit 123 is performed in a state in which home appliance is not communication connected to the server, the state display unit 130 may display a guide message for communication connection. Once communication connection to the server is achieved, the communication connection may be automatically performed afterwards. That is, when the home appliance is powered on, the communication connection may be immediately performed. However, the remote service activation is not frequently input before communication connection.

As previously described, setting of the remote service activation is input of a strong intention of the user who wishes to perform remote control to the home appliance. In addition, the strong intention of the user is displayed on the home appliance using various methods as described above. Consequently, it is necessary to prevent another user from directly manipulating the home appliance irrespective of the strong intention of the user. In addition, it is necessary to prevent children from inappropriately manipulating the control panel 100 to cancel a state in which remote service activation is set.

In order to solve this problem, according to this embodiment, the course selection unit 110 and the option selection unit 120 may be deactivated in a state in which remote service activation is set. That is, input through the course selection unit 110 and the option selection unit 120 may not be possible. In the same manner, the run/pause input unit 150 may be deactivated. When the course selection or the option selection is performed in such a deactivated state, a warning sound may be generated to inform the user of the deactivated state.

According to this embodiment, it may be necessary to directly manipulate the laundry machine irrespective of a strong intention of the user who wishes to perform remote control. That is, the laundry machine may have difficulty in operation or it may be necessary to immediately use the laundry machine.

For example, in a case in which a user who wishes to perform remote control while the user is out returns home earlier than expected, the remote control may not be needed. In another example, one of a couple may return home earlier than the other with the result that it may not be necessary for the other to perform remote control.

In a state in which the remote service activation is set, therefore, cancellation of the remote service activation may be performed through the remote service activation input unit 123 and, in addition, power off may also be possible through the power selection unit 140. The remote service activation may be automatically canceled through such power off. Power off means interruption in operation of the laundry machine in an emergency. As previously described, setting and cancellation of the remote service activation are performed somewhat strictly and complicatedly. In order to easily cope with emergency, input through the power selection unit 140 may be possible even in a state in which the remote service activation is set.

In a state in which the remote service activation is set, on the other hand, door locking is required because it is not possible to know when a remote control command has been issued. In addition, setting and cancellation of the remote service activation through a door locking input unit may be deactivated. This may mean that only input through the power selection unit 140 and the remote service activation input unit 123 is possible on the control panel 100 in a state in which the remote service activation is set.

In addition, in a state in which the remote service activation is set, door locking may be performed until the remote service activation is canceled. This is provided to prevent the home appliance from being operated through remote control in a state in which the door locking is released. In a case of door locking, an expression "door locked" may be displayed on the state display unit 130.

When the remote service activation is set through the home appliance as described above, remote control through the external terminal is possible. Until the remote control is performed, a remote control ready state may be displayed on the home appliance as shown in FIG. 20.

In the home appliance, on the other hand, only manipulation through the power selection unit 140 and the remote service activation input unit 123 may be possible. Consequently, the remote service activation may be canceled only by the power selection unit 140 and the remote service activation input unit 123. When the operation of the home appliance is initiated and ended through remote control, the home appliance may be automatically powered off. Even in this case, therefore, the remote service activation may be canceled.

The remote service activation may not be set through the external terminal. This is because the home appliance may not be remotely controlled in a specific state, for example in a state in which the door is open. Consequently, it is necessary for the external terminal to indirectly cancel the remote service activation by powering off.

Hereinafter, an operational relationship among the server, the home appliance, and the external terminal for a remote service and a display state of the home appliance and the external terminal will be described in detail.

Figure 21:
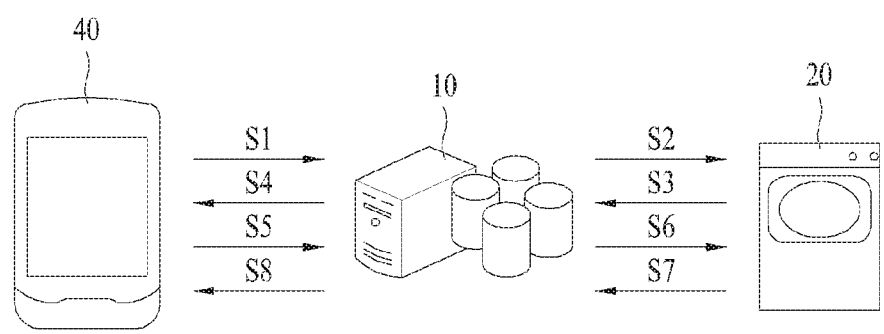
FIG. 21 is a view showing a communication flow among an external terminal for remote control, a server, and a home appliance.

A flow for remote control of the home appliance 20, for example a washing machine, through the external terminal 40 will be described with reference to FIG. 21.

A step (S1) of transmitting user information to the server 10 through the external terminal 40 to log in to the server 10 may be performed. To this end, execution of the application, registration of the product, and input of user information including a user ID and a password previously described with reference to FIGS. 15 to 17 will be performed first.

When the user logs in to the server 10 through the external terminal 40, the server 10 specifies a home appliance for a remote service (remote control) based on the user information. That is, the server 10 specifies an owner and location of the home appliance. In other words, the server 10 specifies a home appliance to be remotely controlled. Subsequently, the server 10 determines whether remote service activation of the specified home appliance is set (S2).

The home appliance may be specified using various methods.

First, the server 10 may specify the home appliance based on user information received from the external terminal 40 and home appliance information stored in the server 10 in a state of being matched with the user information. In addition, the server may specify the home appliance for a remote service based on home appliance information received from the external terminal 40 together with the user information. In this case, an application executed by the external terminal may be provided for one home appliance, for example a washing machine. That is, the user information and the home appliance information may be matched with each other in a one to one fashion. Consequently, the server may confirm information regarding who will remotely control his/her specific home appliance. As a result, the server may specify the home appliance based on the user information.

On the other hand, the application executed by the external terminal may be provided for a plurality of home appliances. That is, a plurality of home appliance information items may be matched with the user information. After login, the user may select one home appliance to be remotely controlled. For example, the user may select one from between a drying machine and a washing machine. That is, the user may select the washing machine. Even in this case, therefore, the server may confirm information regarding who will remotely control his/her specific home appliance. As a result, the server may specify the home appliance, for example the washing machine, based on the user information.

The confirmation step may be performed by the server 10 requesting state information from the home appliance 20 and the home appliance 20 transmitting the state information to the server 10. When the state information is transmitted to the server 10, the server 10 transmits the state information to the external terminal 40 (S3).

Figure 22:
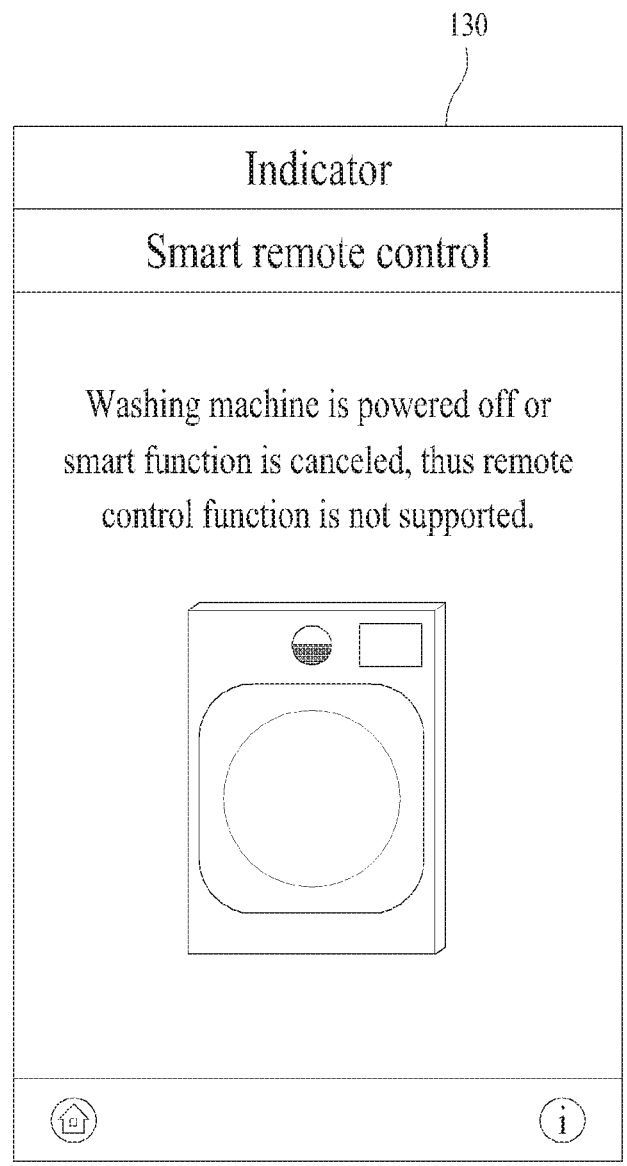
FIG. 22 is a view showing an embodiment of a screen of an external terminal in a state in which remote control is not possible.

In a state in which the home appliance 20 is powered off or remote service activation is not set, remote control is not possible. In a state in which the remote service activation is not set or the home appliance 20 is powered off, therefore, such state information may be received by the external terminal 40 and displayed on the external terminal 40. FIG. 22 shows that impossibility of remote control is displayed on the external terminal.

On the other hand, in a state in which the remote service activation is set, the home appliance may be remotely controlled. Consequently, current state information of the home appliance may be transmitted to the external terminal through the server and displayed on the external terminal. The state information may include information regarding whether the remote service activation is set, a state in which remote control is ready, a state in which the home appliance is being operated, a state in which operation of the home appliance is paused, and a scheduled operation state.

Figure 23:
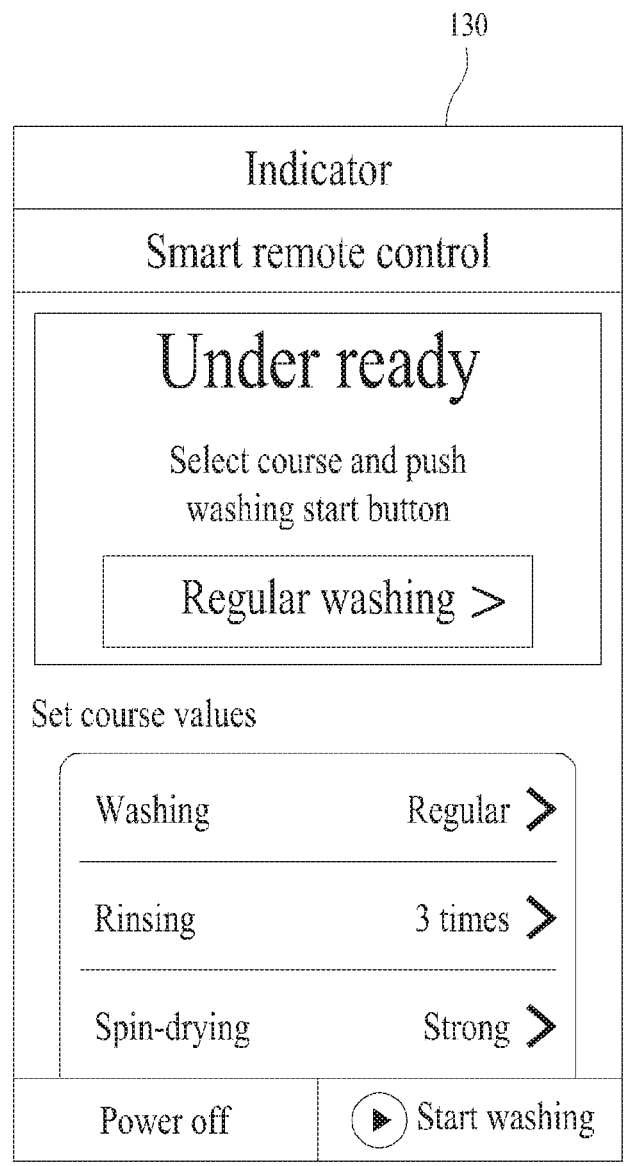
FIG. 23 is a view showing an embodiment of a screen of an external terminal in a remote control ready state.

In a state in which the remote service activation is set, a current home appliance state may correspond to at least one selected from among a state in which remote control is ready, a state in which the home appliance is being operated, a state in which operation of the home appliance is paused, and a scheduled operation state. Consequently, the external terminal may receive the current home appliance state through the server and display the current home appliance state. In the beginning of remote control, remote control is ready. FIG. 23 shows that a remote control ready state is displayed on the external terminal.

The server 10 may determine which model the home appliance corresponds to based upon the home appliance information received from the home appliance or stored in the server 10 and thus have a variety of variable operation information of the model.

For a laundry machine, the variable operation information may include a washing course, a drying course, and various options necessary to perform each course. The options may include a washing degree (contamination degree), the number of times of rinsing, temperature of wash water, a spin-drying degree, and whether or not steam is used. That is, the variable operation information may be differently set per specific model. For example, for a model having no steam function, the variable operation information may not include whether or not steam is used. In addition, courses that can be selected or the number of courses may be changed per model.

In a state in which remote service activation the home appliance is set, the server 10 specifies variable operation information corresponding to the home appliance information. Subsequently, the server 10 may transmit the variable operation information of the home appliance to the external terminal 40 (S4).

As shown in FIG. 23, a remote control ready state may be displayed on the external terminal 40. In this case, the home appliance is not operated. As previously described, therefore, the variable operation information received through the server may also be displayed as shown in FIG. 23.

The variable operation information may be information that can be changed by the external terminal. Consequently, the user may select a specific course from a course menu through the external terminal and select options from an option menu. In addition, the user may select a washing start menu to remotely control the laundry machine such that the laundry machine starts to perform washing. That is, the external terminal 40 may transmit a command signal to the home appliance such that the home appliance is operated based on the received variable operation information (S5). In addition, the external terminal 40 may set the variable operation information and transmit a command to the home appliance such that the home appliance is operated based on the set variable operation information. The command is transmitted to the home appliance 20 via the server 10 to operate the home appliance (S6).

Meanwhile, as shown in FIG. 23, power off of the home appliance may be remotely commanded in the remote control ready state. The home appliance may be powered off according to such a command.

In addition to display on the external terminal, start of the remote control may be displayed on the home appliance. That is, operation of the home appliance through the remote control may be display for a predetermined time and then the home appliance may be operated.

Figure 24:
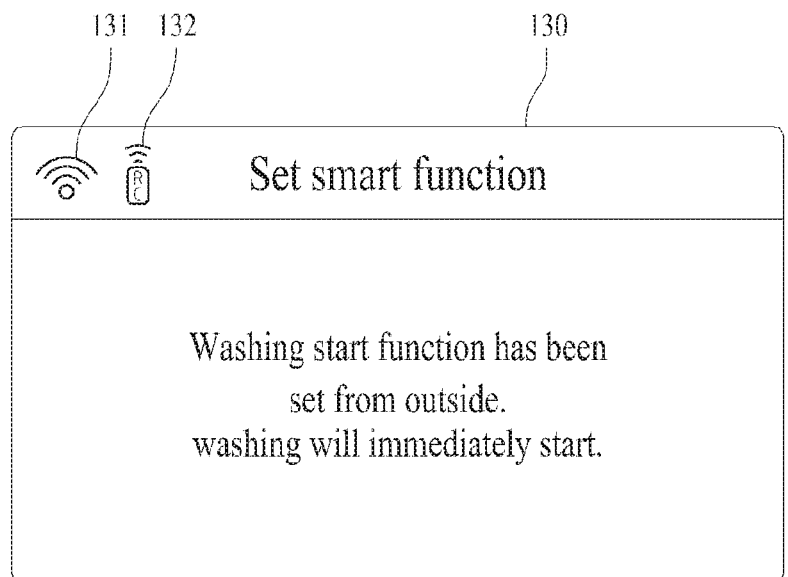
FIG. 24 is a view showing an embodiment of a screen of a display unit of a home appliance notifying of start of washing through remote control.
Figure 25:
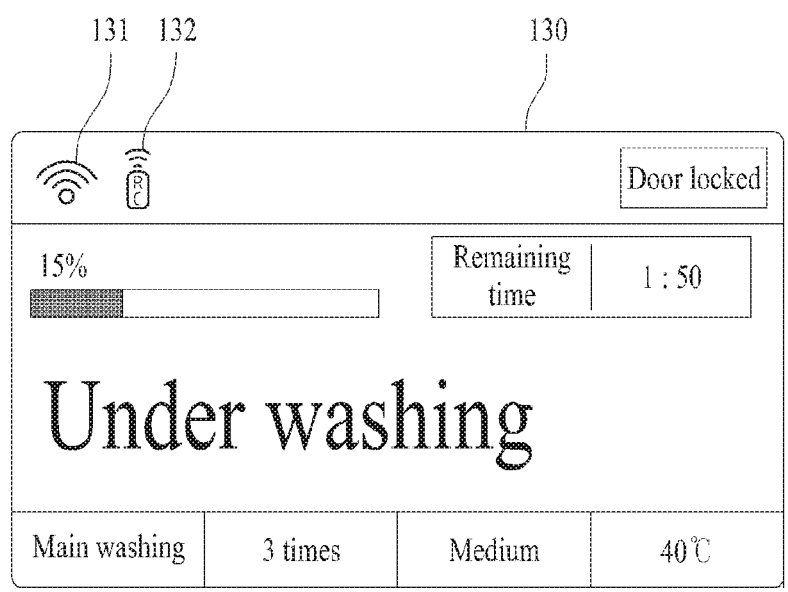
FIG. 25 is a view showing an embodiment of a screen of a display unit of a home appliance displaying an operation state of the home appliance.

Upon reception of the remote control command through the server, the screen of the state display unit 130 of the home appliance may be switched from the screen shown in FIG. 20 to a screen shown in FIG. 24. That is, operation of the home appliance through the remote control may be displayed for a predetermined time, for example 5 seconds, and then the screen may be switched to display an operation state of the home appliance as shown in FIG. 25.

Meanwhile, when the home appliance is operated, the operation state of the home appliance may be transmitted to the server (S7). Of course, the operation state as shown in FIG. 25 may be displayed on the state display unit 130. The operation state may be transmitted to the external terminal 40 and, as shown in FIG. 26, the external terminal may display the operation state of the home appliance (S8).

For the laundry machine, which a course is being performed and which options have been selected and are being executed may be displayed. In addition, performance of one selected from among a washing cycle, a rinsing cycle, and a spin-drying cycle may be displayed. Of course, time information, such as a time remaining until washing is ended, may also be displayed.

Figure 26:
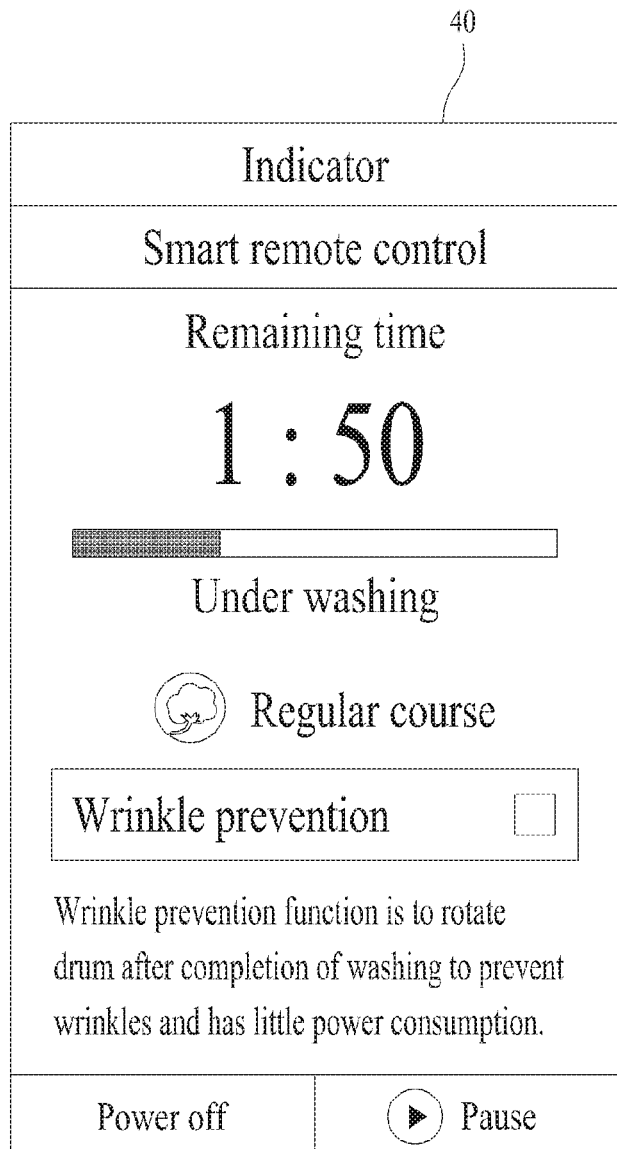
FIG. 26 is a view showing an embodiment of a screen of an external terminal displaying an operation state of a home appliance.

When the operation state of the home appliance is displayed, power off of the home appliance may be commanded as shown in FIG. 26. In addition, pause of the home appliance may be commanded. That is, the operation of the home appliance may be paused or the home appliance may be powered off by selecting a pause menu and a power off menu displayed on the external terminal.

For the laundry machine, the operation of the home appliance is performed by driving hardware, such as driving of the drum or supply of water. Consequently, remote control that can be performed during operation of the home appliance may be minimized. Consequently, only a power off or pause command may be possible. Of course, selection of a wrinkle prevention function is not instant control and thus may be possible even during operation of the home appliance.

Figure 27:
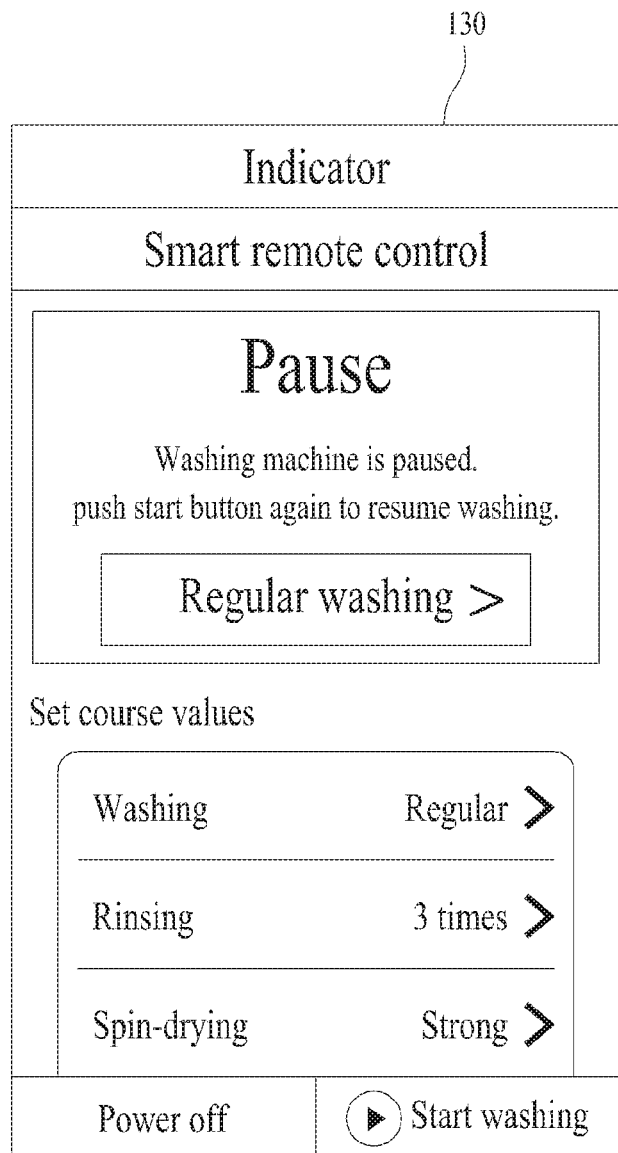
FIG. 27 is a view showing an embodiment of a screen of an external terminal displaying a pause state of a home appliance.
Figure 28:
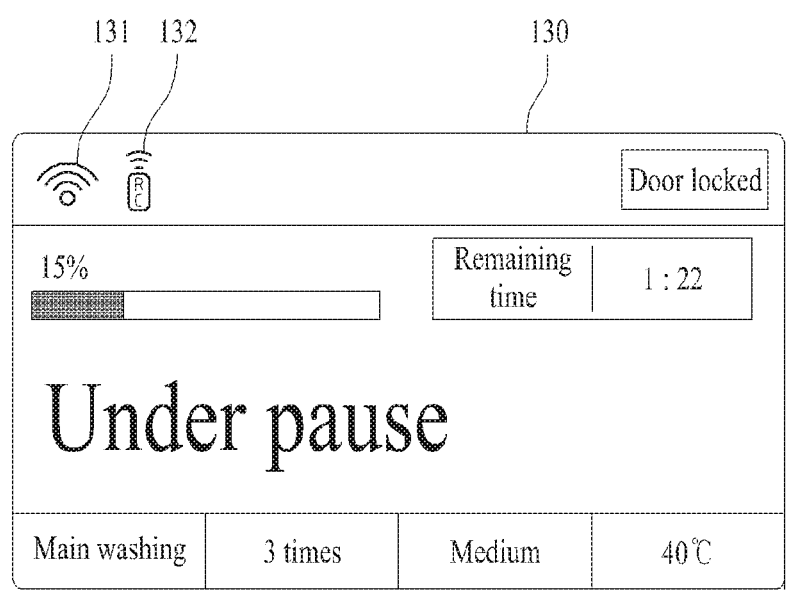
FIG. 28 is a view showing an embodiment of a screen of a display unit of a home appliance displaying a pause state of the home appliance.

A pause state is displayed on the external terminal and the home appliance as shown in FIGS. 27 and 28. In the pause state, the set variable operation information may be changed. In addition, in the pause state, resuming may be selected. When the pause state is displayed on the external terminal, therefore, a resuming menu may be displayed and resuming may be selected to resume operation of the home appliance.

Figure 29:
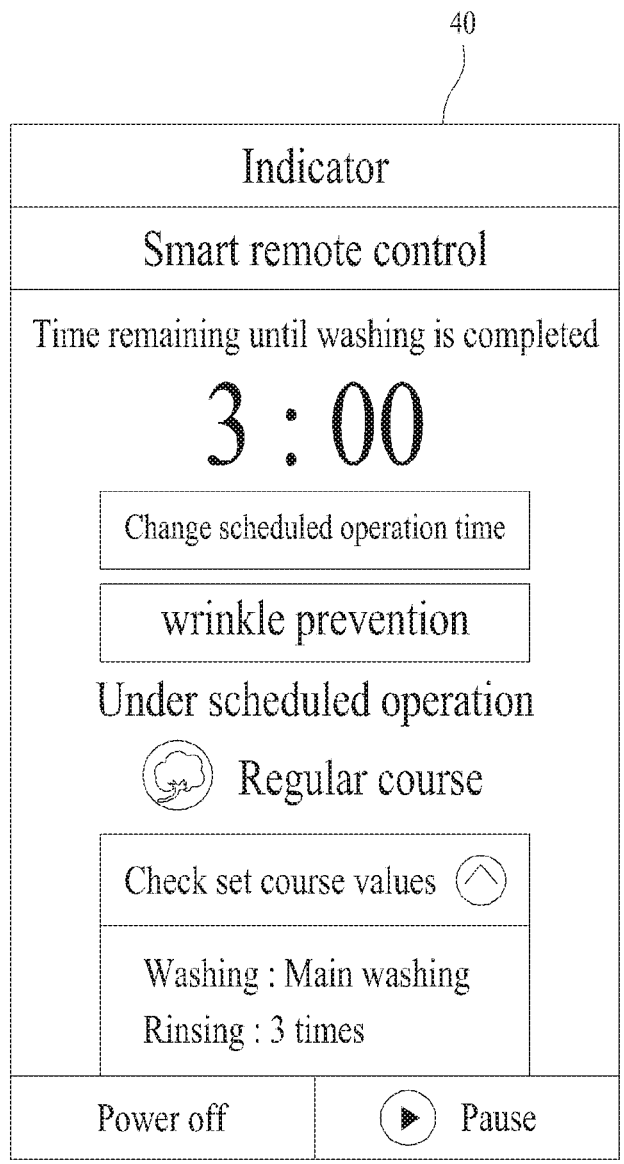
FIG. 29 is a view showing an embodiment of a screen of an external terminal displaying a scheduled operation state of a home appliance.

As previously described, the state information of the home appliance may be scheduled operation information. Consequently, a scheduled operation state of the home appliance may be displayed on the external terminal. FIG. 29 shows an example of display on the external terminal when the washing machine is in a scheduled operation state, wherein at least one selected from among a time remaining until operation of the washing machine is ended, a selected washing course, detailed options of the selected course, and a scheduled operation time change menu may be displayed.

The scheduled operation state, i.e. under the scheduled operation, means that washing will be ended when a set time elapses from now, i.e. when a displayed time elapses, and means that washing is not being carried out at the present time.

Figure 30:
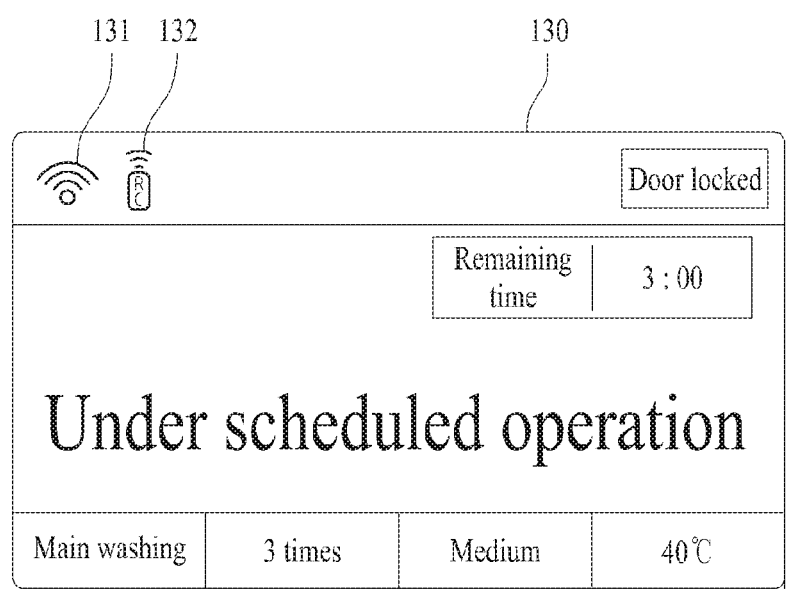
FIG. 30 is a view showing an embodiment of a screen of a display unit of a home appliance displaying a scheduled operation state of the home appliance.

FIG. 30 shows the state display unit 130 of the washing machine corresponding to the display on the external terminal shown in FIG. 29. In the same manner, the state display unit 130 of the washing machine may display that the washing machine is under scheduled operation, the remaining time, and detailed options.

In a case in which the washing machine is under scheduled operation, the user may change a scheduled operation time through the external terminal. That is, the user may change the scheduled operation time by pushing a scheduled operation time change item shown in FIG. 29.

In a case in which the washing machine is in the scheduled operation state, detailed options of the scheduled washing course, i.e. detailed values of the set course, may be checked or changed. That is, the variable operation information, which is received from the server and displayed, may be set. In addition, the washing machine may be powered off or the operation of the washing machine may be paused.

Figure 31:
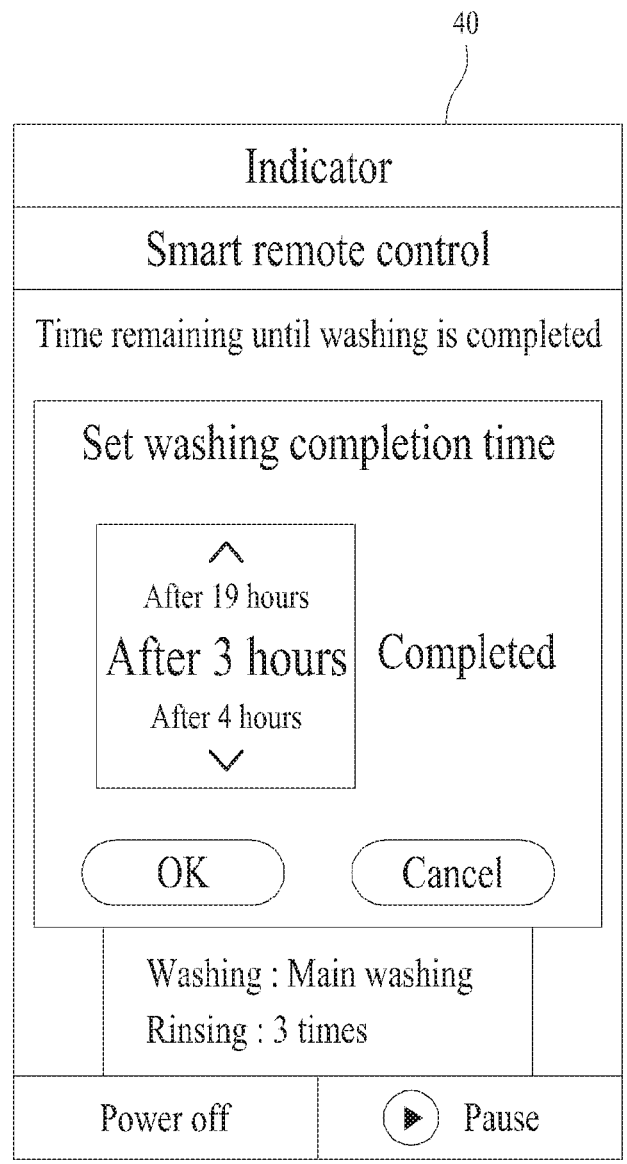
FIG. 31 is a view showing a screen when a scheduled operation time is changed on the screen of FIG. 29.

FIG. 31 shows an example of a popup window displayed in a case in which the scheduled operation time change item is selected. The user may change the scheduled operation time through the popup window as needed. In a case in which the scheduled operation time change is confirmed or canceled, the popup window disappears and switching to the screen shown in FIG. 29 is performed. At this time, a time remaining until washing is ended is displayed as a changed time. That is, in a case in which three hours is changed to four hours, the three hours in FIG. 29 will be changed to four hours.

Figure 32:
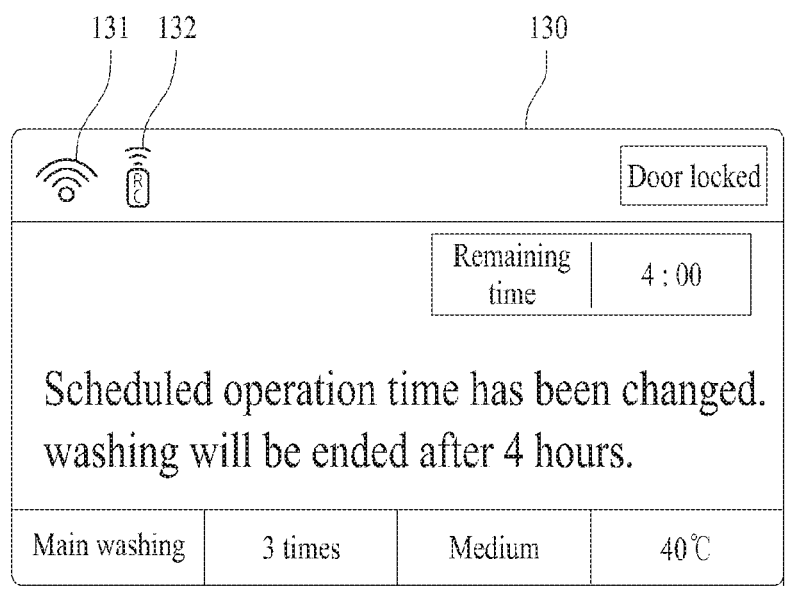
FIG. 32 is a view showing an embodiment of a screen of a display unit of a home appliance after a scheduled operation time is changed.

FIG. 32 shows an example of the state display unit 130 in a case in which the scheduled operation time is changed through the external terminal. In this case, information regarding the scheduled operation time change and information regarding the changed remaining time may be displayed. Afterwards, when a set time (for example, three seconds) elapses, the screen of FIG. 32 is switched to the screen of FIG. 30. Of course, the remaining time, changed from three hours to four hours, is displayed.

When the home appliance starts to operate through a scheduled operation, the screens shown in FIGS. 25 and 26 may be displayed on the home appliance and the external terminal, respectively.

Meanwhile, in a case in which the home appliance is a laundry machine, a wrinkle prevention function may be selected through the external terminal.

The wrinkle prevention function is a function for driving the drum after the course is ended to prevent wrinkles from being formed in the laundry. When washing or rinsing is ended, the laundry in the drum is pressed down on the bottom of the drum due to gravity. Particularly, in a case in which washing is ended, the laundry has moisture remaining therein, which is liable to cause the laundry to form wrinkles due to load of the laundry. In addition, in a case in which the laundry is entangled, wrinkles may be excessively formed in the laundry.

Therefore, continuous, periodic, or intermittent driving of the drum is required for wrinkle prevention.

A drying machine or a combo washer dryer may supply cold air to the laundry. Therefore, cold air may also be continuously, periodically, or intermittently supplied into the drum.

The wrinkle prevention function is very effective in a case in which the laundry is left in the drum for a long time after the course is ended. Therefore, the wrinkle prevention function may be selected and carried out through the external terminal only. That is, the control panel of the washing machine, the drying machine, or the combo washer dryer may not be provided with a selection unit for selecting such a function. This is because it is less liable that the laundry is left in the drum for a long time in a case in which the user directly manipulates the control panel to carry out washing.

Only in a case in which remote control is set, therefore, the function may be selected through the external terminal.

As shown in FIG. 26, the user may select execution of the wrinkle prevention function by selecting a wrinkle prevention function item displayed on the external terminal. A wrinkle prevention execution time may be input by default. For example, the time may be preset to four hours by default. This is because wrinkles are prevented from being formed in the laundry for a long time even in a case in which the time is set only to be short. In addition, the user may push any button of the washing machine to easily cancel the wrinkle prevention function in a case in which the time is set to be long.

For example, as shown in FIG. 26, in a case in which an hour and fifty minutes remains until washing is ended and three hours remains until the user arrives at home, the user may select the wrinkle prevention function. Even when the user arrives at home after five hours, therefore, the wrinkle prevention function is being carried out. The user, having arrived at home, may push any button of the washing machine to stop operation of the washing machine.

Figure 33:
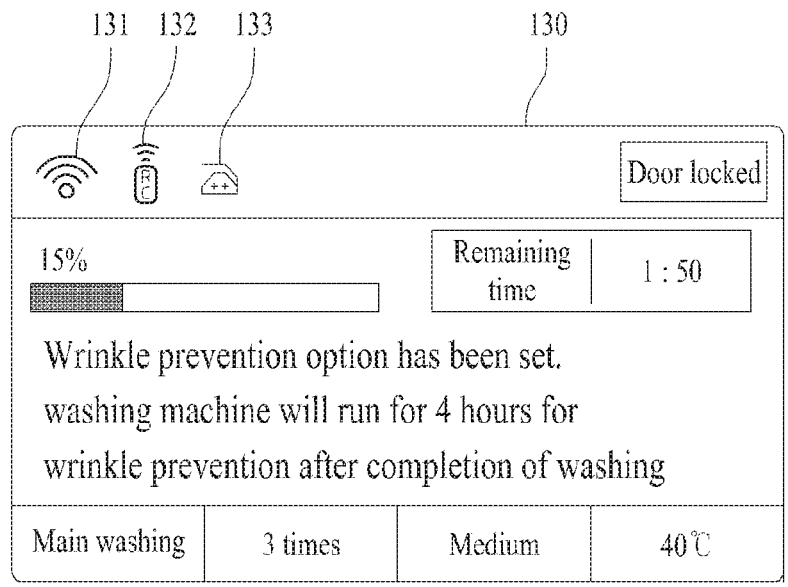
FIG. 33 is a view showing an embodiment of a screen of a display unit of a home appliance displaying a state in which a wrinkle prevention function is set.

When the wrinkle prevention function is selected through the external terminal, a screen shown in FIG. 33 may be displayed on the home appliance.

The previous screen shown in FIG. 25 is switched to the screen shown in FIG. 33 to display that the wrinkle prevention function has been selected instead of the information regarding washing in progress. In addition, a wrinkle prevention completion time may be displayed. When a set time elapses, switching to the screen shown in FIG. 26, i.e. the previous screen, may be performed.

Figure 34:
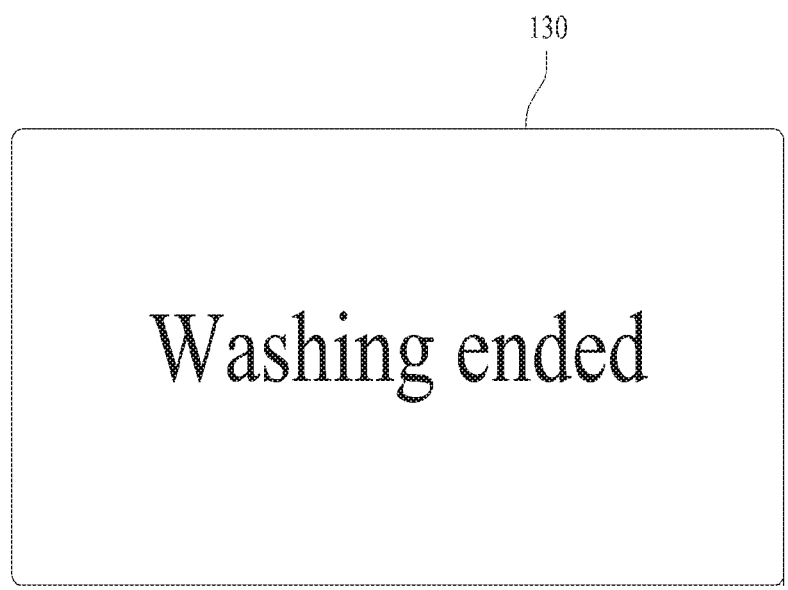
FIG. 34 is a view showing an embodiment of a screen of a display unit of a home appliance displaying completion of operation of the home appliance.
Figure 35:
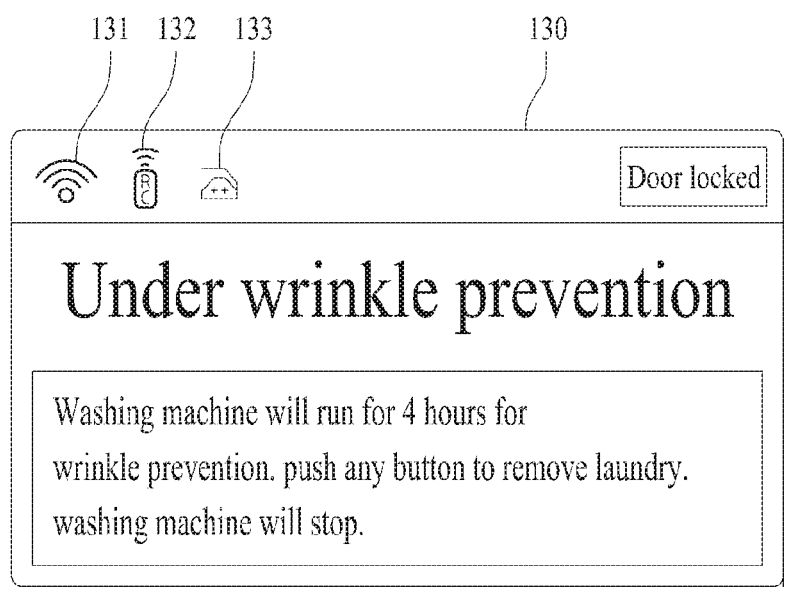
FIG. 35 is a view showing an embodiment of a screen of a display unit of a home appliance displaying a state in which a wrinkle prevention function is executed.

FIG. 34 shows an example of the state display unit of the washing machine in a case in which the course is ended. In a case in which the wrinkle prevention function is not carried out, the washing machine may be powered off after a certain time elapses. In a case in which the wrinkle prevention function is carried out, on the other hand, the washing machine may not be powered off and, as shown in FIG. 35, a message stating that the wrinkle prevention function is being carried out may be displayed. In this case, a screen shown in FIG. 24 and a screen shown in FIG. 35 may be alternately displayed for a predetermined time in order for the user to more clearly confirm a current state of the washing machine.

Meanwhile, the wrinkle prevention function may be selected even in a case in which the laundry machine is ready to operate in a scheduled operation state as well as in a case in which the laundry machine is being operated. As shown in FIG. 29, therefore, the wrinkle prevention function may be selected even in the scheduled operation state. In addition, selection of the wrinkle prevention function may be displayed on the laundry machine. Such display may be achieved using a wrinkle prevention icon 133 shown in FIGS. 33 and 35. An iron-shaped icon may be displayed on the state display unit 130 to display that the wrinkle prevention function has been set and is being carried out.

As previously described, in a state in which the remote service activation is set, the current state of the home appliance may be one selected from among a state in which remote control is ready, a state in which the home appliance is being operated, a state in which operation of the home appliance is paused, and a scheduled operation state. In addition, the state information may include information regarding an error of the home appliance or a communication connection error.

Information regarding an error of the home appliance, for example no supply of water, may be transmitted from the home appliance to the external terminal through the server and displayed on the external terminal. In this case, the external terminal may perform only monitoring and the error may be corrected by the home appliance.

In addition, the external terminal transmits various commands to the server. When the external terminal does not receive return information corresponding to the transmitted commands, however, communication connection error information may be displayed on the external terminal. Such a communication connection error may be generated between the server and the external terminal or between the server and the home appliance.

The communication connection error may be displayed in a case in which the return information or the state information is not received by the external terminal for a set time.

Hereinafter, a control method for the home appliance, particularly the laundry machine, effectively displaying information regarding remote control will be described.

The laundry machine is provided to communicate with the server and may include a control panel having a state display unit to display communication connection with the server. The laundry machine may include a remote service activation input unit 123 to set or cancel remote service activation.

First, when the remote service activation is set, an icon 132 indicating a state in which the remote service activation is set is continuously displayed until the remote service activation is canceled. Of course, the remote service activation may be set based on communication connection between the laundry machine and the server. Consequently, the state display unit 130 may display that communication connection between the laundry machine and the server is being performed. In this case, an icon 131 indicating a communication connection state may be continuously displayed on the state display unit 130.

As a result, the user may intuitively confirm the communication connection state and the remote service activation state through the icons 131 and 132 displayed on the state display unit 130.

Meanwhile, the user may intuitively confirm a current state of the laundry machine. To this end, information indicating a state in which the remote service activation is set may be displayed on the state display unit 130 together with the icon 132 until the laundry machine receives a remote control command from the server. Consequently, the user may clearly confirm that the laundry machine is in a remote control ready state.

When the laundry machine receives a remote control command from the server, start of operation of the laundry machine may be displayed on the state display unit 130 together with the icon 132. That is, information regarding that the laundry machine will start to operate soon may be displayed. Consequently, a user approaching the laundry machine may not be confused due to abrupt operation of the laundry machine.

In addition, when a predetermined time, for example 5 seconds, elapses after the start of operation of the laundry machine is displayed, an operation state of the laundry machine may be displayed on the state display unit 130 together with the icon 132.

As described above, the state display unit 130 may display the icons and the information such that a user approaching the laundry machine may intuitively confirm the current state of the laundry machine. Consequently, confusion between the user performing the remote control and the user approaching the laundry machine may be prevented.

As is apparent from the above description, the embodiments of the present invention as described above have the following effects.

It is possible to provide a home appliance that is capable of performing not only original functions of the home appliance but also extended or new functions of the home appliance without change in hardware of the home appliance.

It is possible to provide a home appliance that is capable of communicating with external devices to easily receive a variety of information through a server or an external terminal such that functions of the home appliance are extended and convenient use of the home appliance is achieved using such information and an online system including the same.

It is possible to provide a home appliance that is capable of communicating with external devices to transmit a variety of information regarding the home appliance to a server or an external terminal such that functions of the home appliance are extended and convenient use of the home appliance is achieved using such information and an online system including the same.

It is possible to provide a home appliance that is capable of easily communicating with external devices such that convenient use of the home appliance is achieved and an online system including the same.

It is possible to provide a home appliance that is capable of enabling a user to easily confirm information regarding the home appliance without directly accessing the home appliance and to control the home appliance and an online system including the same.

It is possible to provide a home appliance, communication connection of which is easily and conveniently achieved although the home appliance does not have a text input means.

It is possible to provide a home appliance, communication connection of which is possible and information displayed on which is diversified such that convenient use of the home appliance is achieved although the home appliance does not have a display unit to display a variety of information.

It is possible to provide a home appliance that is capable of minimizing confusion between direct manipulation of the home appliance and remote control of the home appliance and a control method of the home appliance.

It is possible to provide a home appliance, particularly a laundry machine, which is capable of improving user satisfaction and reliability and a control method of the home appliance.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

Accordingly, the present invention is directed to a home appliance and an online system including the same that substantially obviate one or more problems due to limitations and disadvantages of the related art.

An object of the present invention is to provide a home appliance that is capable of performing not only original functions of the home appliance but also extended or new functions of the home appliance without change in hardware of the home appliance.

Another object of the present invention is to provide a home appliance that is capable of communicating with external devices to easily receive a variety of information through a server or an external terminal such that functions of the home appliance are extended and convenient use of the home appliance is achieved using such information and an online system including the same.

Another object of the present invention is to provide a home appliance that is capable of communicating with external devices to transmit a variety of information regarding the home appliance to a server or an external terminal such that functions of the home appliance are extended and convenient use of the home appliance is achieved using such information and an online system including the same.

Another object of the present invention is to provide a home appliance that is capable of easily communicating with external devices such that convenient use of the home appliance is achieved and an online system including the same.

Another object of the present invention is to provide a home appliance that is capable of enabling a user to easily confirm information regarding the home appliance without directly accessing the home appliance and to control the home appliance and an online system including the same.

Another object of the present invention is to provide a home appliance, communication connection of which is easily and conveniently achieved although the home appliance does not have a text input means.

Another object of the present invention is to provide a home appliance, communication connection of which is possible and information displayed on which is diversified such that convenient use of the home appliance is achieved although the home appliance does not have a display unit to display a variety of information.

Another object of the present invention is to provide a home appliance that is capable of minimizing confusion between direct manipulation of the home appliance and remote control of the home appliance and a control method of the home appliance.

A further object of the present invention is to provide a home appliance, particularly a laundry machine, which is capable of improving user satisfaction and reliability and a control method of the home appliance.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a laundry machine communicates with a server, is remotely controlled by an external terminal through the server, and has a control panel for a user interface, wherein the control panel includes a remote service activation input unit to set or cancel remote service activation according to user selection and the remote control is performed only in a case in which the remote service activation is set.

The control panel may include a course selection unit, an option selection unit, a start button, and a display unit to display state information of the laundry machine. In a case in which the display unit is a touchscreen, at least one selected from among the remote service activation input unit, the course selection unit, the option selection unit, and the start button may be displayed on the display unit.

In a case in which the remote service activation is set, the course selection unit and the option selection unit may be deactivated.

The control panel may include a power button and, in a case in which the remote service activation is set, the remote service activation may be canceled only by any one selected from between user input of the power button and user cancellation through the remote service activation input unit at the laundry machine manually.

In a case in which the remote service activation is set, door locking may be performed until the remote service activation is canceled.

The control panel may include a door locking unit and, in a case in which the remote service activation is set, the door locking unit may be deactivated.

In a case in which the remote service activation is set, the remote service activation may be canceled by power off of the laundry machine due to completion of operation of the laundry machine through the remote control or power off of the laundry machine through the remote control.

The remote service activation input unit may be provided only to set or cancel the remote service activation.

The remote service activation input unit may be pushed for a longer time than a push time necessary for input through the option selection unit to set or cancel the remote service activation.

The remote service activation input unit may be provided to select an original function of the laundry machine and may be configured to set or cancel the remote service activation using another input method.

The laundry machine may further include a Wi-Fi™ communication module equipped in or connected to the laundry machine, wherein the laundry machine may be communication connected to the server via the Wi-Fi™ communication module and an access point (AP).

The display unit may be provided to display a Wi-Fi™ communication connection state and a remote service activation state.

The remote service activation may be set only in the Wi-Fi™ communication connection state.

The Wi-Fi™ communication module may support a setup mode for communication connection to the server and a use mode for communication and the control panel may be provided with an input unit to operate the setup mode.

After accessing the setup mode through the external terminal is performed, Service Set Identifier (SSID) information of the AP which will access the Wi-Fi™ communication module and user information necessary to register the laundry machine with the server may be input through the external terminal such that the setup mode is switched to the use mode.

The remote control may be performed by the laundry machine receiving a course input command, an option input command, a laundry machine operation start command, a laundry machine operation pause command, and a power off command through the server.

A wrinkle prevention function for driving a drum after a course of the laundry machine is ended to prevent wrinkles from being formed in laundry may be selected only through the remote control.

In another aspect of the present invention, a control method of a laundry machine configured to communicate with a server and including a control panel having a display unit to display communication connection with the server includes displaying that the laundry machine is being communication connected to the server on the display unit, when remote service activation is set through a remote service activation input unit provided at the control panel during communication connection between the laundry machine and the server, displaying a state in which the remote service activation is set on the display unit, receiving a remote control command from the server and displaying start of operation of the laundry machine on the display unit, and displaying an operation state of the laundry machine on the display unit when a predetermined time elapses after the start of operation of the laundry machine is displayed.

The step of displaying the state in which the remote service activation is set may include continuously displaying an icon indicating the state in which the remote service activation is set on the display unit until the remote service activation is canceled and displaying information indicating the state in which the remote service activation is set on the display unit together with the icon until the laundry machine receives a remote control command from the server.

In another aspect of the present invention, a control method of a laundry machine configured to communicate with a server and including a control panel having a display unit includes displaying that the laundry machine is being communication connected to the server on the display unit, when remote service activation is set through a remote service activation input unit provided at the control panel during communication connection between the laundry machine and the server, continuously displaying an icon indicating a state in which the remote service activation is set on the display unit until the remote service activation is canceled, displaying information indicating a state in which the remote service activation is set on the display unit together with the icon until the laundry machine receives a remote control command from the server, receiving a remote control command from the server and displaying start of operation of the laundry machine on the display unit together with the icon, and displaying an operation state of the laundry machine on the display unit together with the icon when a predetermined time elapses after the start of operation of the laundry machine is displayed.

The remote service activation of the laundry machine may be canceled and the icon may not be displayed only by any one selected from between user cancellation through the remote service activation input unit and power off of the laundry machine performed by the user.

Upon receiving a remote control command from the server in the state in which the remote service activation is set, the laundry machine may transmit state information of the laundry machine to the server.

The state information may include at least one selected from among a state in which remote control is ready, a state in which the laundry machine is being operated, a state in which operation of the laundry machine is paused, and a scheduled operation state.

The state information may include error information of the laundry machine during operation of the laundry machine.

The control method may further include displaying a remote service activation setting or cancellation menu on the display unit according to input through the remote service activation input unit.

The control method may further include displaying how to select and input one item from the remote service activation setting or cancellation menu on the display unit.

In another aspect of the present invention, a method of using an online system includes registering a user with a server based on user information input using a user site, inputting the user information to an external terminal provided to remotely control a laundry machine to log in to the server, the server determining whether a laundry machine of the user has been registered with the server after the login and transmitting a result of determination to the external terminal, upon determining that a registered laundry machine is present, the external terminal displaying the registered laundry machine such that the user can select the registered laundry machine and, upon determining that no registered laundry machine is present, the external terminal displaying how to register a laundry machine with the server, upon selecting a laundry machine to be remotely controlled through the external terminal, the server determining a remote service activation state of the laundry machine, upon determining that the remote service activation of the laundry machine is set, the server transmitting variable operation information of the laundry machine to the external terminal, the external terminal transmitting a command signal to the server such that the laundry machine is operated based on the received variable operation information, the server receiving the command signal, and the server transmitting the command signal to the laundry machine such that the laundry machine is operated.

In another aspect of the present invention, an online system includes a server to provide remote control, a user site to perform registration of a user based on input of user information and to transmit the user information to the server such that the user is registered with the server, a home appliance, having a unique device identification (ID), to transmit the user information registered with the user site and the device ID to the user site or the server such that the user information and the device ID are registered with the server, the home appliance being communication connected to the server through Wi-Fi™ communication connection with an AP, the home appliance being remotely controlled through the server when remote service activation is set through a remote service activation input unit, and an external terminal communication connected to the server to transmit the user information and information of the home appliance to be remotely controlled to the server and to transmit a command to remotely control the home appliance to the server.

In a case in which the remote service activation of the home appliance is set, the server may transmit variable operation information of the home appliance to the external terminal and the external terminal may transmit a command signal to the server such that the home appliance is operated based on the received variable operation information.

The variable operation information may be changed by the external terminal.

The server may specify variable operation information corresponding to the information of the home appliance and transmit the specified variable operation information to the external terminal.

The external terminal may set the variable operation information and transmit the set variable operation information to the server such that the home appliance is operated based on the set variable operation information.

In another aspect of the present invention, a method of using an online system includes transmitting user information to a server through an external terminal to log in to the server, the server specifying a home appliance for a remote service based on the user information received from the external terminal and determining whether remote service activation of the specified home appliance is set, upon determining that the remote service activation of the home appliance is set, the server transmitting variable operation information of the home appliance to the external terminal, the external terminal transmitting a command signal to the server such that the home appliance is operated based on the received variable operation information, the server receiving the command signal, and the server transmitting the command signal to the home appliance such that the home appliance is operated.

In another aspect of the present invention, an online service system includes a server, a home appliance having a Wi-Fi™ communication module supporting a setup mode for communication connection to the server and a use mode for communication, an input unit to operate the setup mode, and a remote control activation input unit to set or cancel online service activation, and an external terminal accessing the setup mode to input SSID information of an AP which will access the communication module and user information necessary to register the home appliance with the server such that the setup mode is switched to the use mode and logging in to the server to request a remote service of the home appliance from the server, when the online service activation of the home appliance is set, such that the remote service of the home appliance is performed.

In another aspect of the present invention, an online service system includes a server, a home appliance having a Wi-Fi™ communication module supporting a setup mode for communication connection to the server and a use mode for communication, an input unit to operate the setup mode, and a remote control activation input unit to set or cancel online service activation, and an external terminal accessing the setup mode to input SSID information of an AP which will access the communication module and user information necessary to register the home appliance with the server such that the setup mode is switched to the use mode and logging in to the server to request a remote service of the home appliance from the server, when the online service activation of the home appliance is set, such that the remote service of the home appliance is performed.

In another aspect of the present invention, an online service system includes a server, a home appliance having a Wi-Fi™ communication module communication connected to the server and an online service activation input unit to set or cancel online service activation, and an external terminal configured to receive variable operation information of the home appliance from the server only in a case in which the online service activation of the home appliance is set, to set the variable operation information, and to transmit a command signal to the server such that the home appliance is operated based on the set variable operation information, thereby remotely controlling the home appliance.

In another aspect of the present invention, a method of using an online system includes transmitting user information to a server through an external terminal to log in to the server, the server specifying a home appliance for a remote service based on the user information received from the external terminal and determining a remote service activation state of the specified home appliance, upon determining that the remote service activation of the home appliance is set, the server receiving state information of the home appliance from the home appliance and transmitting the received state information of the home appliance to the external terminal, and the external terminal receiving and displaying the state information of the home appliance.

In a further aspect of the present invention, a control method of a laundry machine configured to communicate with a server and including a control panel having a display unit to display communication connection with the server includes, when remote service activation is set through a remote service activation input unit provided at the control panel, continuously displaying an icon indicating a state in which the remote service activation is set on the display unit until the remote service activation is canceled, displaying information indicating a state in which the remote service activation is set on the display unit together with the icon until the laundry machine receives a remote control command from the server, receiving a remote control command from the server and displaying start of operation of the laundry machine on the display unit together with the icon, and displaying an operation state of the laundry machine on the display unit together with the icon when a predetermined time elapses after the start of operation of the laundry machine is displayed.

The above features may be complexly implemented in embodiments of the present invention.

It is to be understood that both the foregoing general description and the following detailed description of the present invention are exemplary and explanatory and are intended to provide further explanation of the invention as claimed.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A home appliance that communicates with a server, the home appliance is remotely controlled by an external terminal through the server, and the home appliance has a control panel for a user interface, wherein
the control panel includes a remote service activation input unit to set or cancel remote service activation according to user selection, and an operation information selection unit to select one operation information from among a plurality of operation information,
the home appliance is remotely controlled through the server when remote service activation is set through the remote service activation input unit provided at the home appliance only during communication connection between the home appliance and the server, and
the home appliance is enabled to set the remote service activation only when the home appliance is communication connected to the server.

2. The home appliance according to claim 1, wherein the remote service activation is set only by the remote service activation input unit, and the remote service activation is not set by the external terminal.

3. The home appliance according to claim 1, wherein in response to the setting of the remote service activation at the control panel, deactivating the operation information selection unit such that input through the operation information selection unit is denied.

4. The home appliance according to claim 3, wherein a change of the operation information selected by the operation information selection unit is enabled only via the external terminal when the remote service activation is set via the remote service activation input unit.

5. The home appliance according to claim 1, wherein the control panel includes a display to display state information of the home appliance.

6. The home appliance according to claim 1, wherein the home appliance has a power input unit provided separately from the remote service activation unit at the home appliance.

7. The home appliance according to claim 6, wherein when the remote service activation is set, the remote service activation is canceled only by any one selected from between power off of the home appliance and user cancellation through the remote service activation input unit at the home appliance manually.

8. The home appliance according to claim 1, wherein the remote service activation input unit is provided only to set or cancel the remote service activation.

9. The home appliance according to claim 8, wherein in order to set or cancel the remote service activation, the remote service activation input unit is pushed for a longer time than a push time necessary for input through the operation information selection unit.

10. The home appliance according to claim 1, wherein the remote service activation input unit is provided to select an original function of the home appliance and is configured to set or cancel the remote service activation using another input method.

11. The home appliance according to claim 1, further comprising a wireless communication module equipped in or connected to the home appliance, wherein the home appliance is communication connected to the server via the wireless communication module and an access point (AP).

12. The home appliance according to claim 11, wherein the control panel includes a display to display a wireless communication connection state and a remote service activation state.

13. The home appliance according to claim 11, wherein the wireless communication module supports a setup mode for communication connection to the server and a use mode for communication, and the control panel is provided with an input unit to operate the setup mode.

14. The home appliance according to claim 13, wherein, after accessing the setup mode through the external terminal, Service Set Identifier (SSID) information of the AP, which will access the wireless communication module, and user information necessary to register the home appliance with the server are input at the external terminal such that the setup mode is switched to the use mode.

15. An online system comprising:
a server;
a home appliance, having a unique device identification (ID), to transmit user information and the device ID to the server such that the user information and the device ID are registered with the server, the home appliance being communication connected to the server through a wireless communication connection with an AP; and
an external terminal to be communication connected to the server to transmit the user information and information of the home appliance to be remotely controlled to the server and to transmit a command to remotely control the home appliance to the server,
wherein the home appliance is remotely controlled through the server when remote service activation is set through a remote service activation input unit provided at the home appliance only during communication connection between the home appliance and the server, and
wherein the home appliance is enabled to set the remote service activation only when the home appliance is communication connected to the server.

16. The online system according to claim 15, wherein the remote service activation is set only by the remote service activation input unit, and the remote service activation is not set by the external terminal.

17. The online system according to claim 15, wherein the home appliance includes a function selection unit, and
wherein in response to the setting of the remote service activation at the home appliance, deactivation the function selecting unit such that input through the function selection unit is denied.

18. The online system according to claim 17, wherein a change of the function selected by the function selection unit is enabled only via the external terminal when the remote service activation is set via the remote service activation input unit.

19. The online system according to claim 17, wherein when the function selection unit is selected while deactivated, a warning sound is provided to inform of a deactivated state.

20. The online system according to claim 17, wherein the home appliance has a power input unit separately provided at the home appliance from the remote service activation unit, and
wherein when the remote service activation is set, the remote service activation is canceled only by any one selected from between power off of the home appliance and user cancellation through the remote service activation input unit at the home appliance manually.

* * * * *